US012410588B2

(12) United States Patent
Nakajima et al.

(10) Patent No.: US 12,410,588 B2
(45) Date of Patent: Sep. 9, 2025

(54) HYDRAULIC CONTROL SYSTEM IN WORKING MACHINE

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

(*) Notice: Subject to any disclaimer, the term of this patent is extended or adjusted under 35 U.S.C. 154(b) by 0 days.

(21) Appl. No.: 18/719,959

(22) PCT Filed: Dec. 7, 2022

(86) PCT No.: PCT/EP2022/025555
§ 371 (c)(1),
(2) Date: Jun. 14, 2024

(87) PCT Pub. No.: WO2023/110145
PCT Pub. Date: Jun. 22, 2023

(65) Prior Publication Data
US 2025/0052035 A1 Feb. 13, 2025

(30) Foreign Application Priority Data
Dec. 14, 2021 (JP) ................................ 2021-202417

(51) Int. Cl.
*E02F 9/22* (2006.01)
*E02F 9/20* (2006.01)
(Continued)

(52) U.S. Cl.
CPC .......... *E02F 9/2203* (2013.01); *E02F 9/2004* (2013.01); *E02F 9/226* (2013.01); (Continued)

(58) Field of Classification Search
CPC ....... E02F 9/2225; E02F 9/226; E02F 9/2203; E02F 9/2292
See application file for complete search history.

(56) References Cited

U.S. PATENT DOCUMENTS

2021/0095443 A1 * 4/2021 Fukuda ................ E02F 9/2232

FOREIGN PATENT DOCUMENTS

DE 102016110310 A1 * 12/2017 ........... B66F 17/003
EP 3283696 A1 * 2/2018 ........... E02F 9/2225
(Continued)

OTHER PUBLICATIONS

International Search Report for related to Application No. PCT/EP2022/025555; reported on Mar. 24, 2023.

*Primary Examiner* — Abiy Teka

(57) ABSTRACT

PROBLEM: To avoid the pressure of the actuator oil passage from becoming higher or equal to the upper limit pressure that is set depending on an individual option hydraulic actuator, during non-operation of an option operation lever, even if the actuator oil passage connected to the option hydraulic actuator is not provided with a variable relief valve. SOLUTION: It is configured to release the pressure of the actuator oil passage into the oil tank via the option control valve, the load pressure introducing oil passage, the variable relief valve, by switching the option control valve to load pressure relief positions at which the pressure of the actuator oil passage is allowed to flow into the load pressure introducing oil passage, when the pressure of the actuator oil passages exceeds the upper limit pressure during non-operation of the option operation lever; as well as by controlling the relief setting pressure of the variable relief valve connected to the load pressure introducing oil passage so as to be less than or equal to the upper limit pressure.

3 Claims, 12 Drawing Sheets

(51) Int. Cl.
*F15B 13/02* (2006.01)
*F15B 13/04* (2006.01)

(52) U.S. Cl.
CPC .......... *E02F 9/2292* (2013.01); *F15B 13/026* (2013.01); *F15B 13/0401* (2013.01); *E02F 9/2285* (2013.01); *E02F 9/2296* (2013.01); *F15B 2211/526* (2013.01)

(56) References Cited

FOREIGN PATENT DOCUMENTS

| | | | |
|---|---|---|---|
| EP | 3283696 | B1 | 5/2019 |
| JP | S09158903 | A | 6/1997 |
| JP | 2005249157 | A | 9/2005 |
| JP | 2010168738 | A | 8/2010 |
| JP | 2022120978 | A | 8/2022 |
| WO | 2021132514 | A1 | 7/2021 |

* cited by examiner (A)

(B)

HYDRAULIC CONTROL SYSTEM IN WORKING MACHINE

CROSS-REFERENCE TO RELATED APPLICATION

This Application is a 35 USC § 371 US National Stage filing of International Application No. PCT/EP2022/025555 filed on Dec. 7, 2022 which claims priority under the Paris Convention to Japanese Patent Application No. 2021-202417 filed on Dec. 14, 2021.

FIELD OF THE INVENTION

The present invention relates to the technical field of hydraulic control systems in working machines such as hydraulic shovels.

BACKGROUND OF THE INVENTION

Generally, among working machines such as hydraulic shovels, some are available, which a plurality of option hydraulic actuators is configured to be selectively attachable thereto. For example, in a hydraulic shovel, an option tool such as hydraulically driven breaker or crusher can be detachably attached, in place of a bucket for general purpose use as a working attachment.

In case where a hydraulic circuit for an option hydraulic actuator that drives such an option tool intends to be provided in a hydraulic circuit for a working machine, a circuit that can be shared by a plurality of option hydraulic actuators is required, for the purpose of space-saving and reduction of the number of parts; on the other hand, a circuit capable of responding to the control of an individual option hydraulic actuator is also required. For example, in case where a fork bucket is mounted as an option hydraulic actuator, by setting the supply pressure to the fork cylinder that actuates the fork to be lower than the supply pressure to the bucket cylinder that actuates the bucket, the bucket can be actuated strongly, and the fork can be actuated softly. In this manner, it is required to create a circuit that can control the supply pressure to the option hydraulic actuator in correspondence with the working pressure of individual option hydraulic actuator.

Thus, conventionally, there is known a technique that has enabled to arbitrarily change the supply pressure of an option hydraulic actuator depending on an individual hydraulic actuator, by disposing a relief valve respectively in a pair of actuator oil passages extending from the option control valve, which performs oil supply and discharge control to and from the option hydraulic actuator, to the option hydraulic actuator, and controlling the supply pressure to the option hydraulic actuator in accordance with the setting pressure of the relief valve; as well as by using a variable relief valve capable of changing the setting pressure in response to control signals from the control device as a relief valve (for example, refer to Patent Literature 1).

PRIOR ART DOCUMENTS

Patent Documents

PATENT DOCUMENT 1: Japanese Patent Application Laid-Open No. 2010-168738.

SUMMARY OF THE INVENTION

Problems to be Solved by the Invention

However, the hydraulic control system disclosed in the Patent Literature 1 requires a pair of variable relief valves disposed in a pair of actuator oil passages respectively, upon controlling a supply pressure to an option hydraulic actuator so as to be a pressure corresponding to a working pressure of an individual option hydraulic actuator, which hinders reduction of the number of parts and cost reduction. Thus, there may be studied a circuit capable of controlling the supply pressure corresponding to individual option hydraulic actuator, even if the pair of variable relief valves is omitted; but in this case, if the variable relief valves are omitted, even when a pressure in the actuator oil passage is increased due to external force or gravity, etc. while the option operation lever is not operated, that is, while oil supply and discharge to and from the option hydraulic actuator is not performed, the pressure that is set corresponding to the individual option hydraulic actuator cannot be released via the variable relief valves, and therefore there arises a problem that an overload might be applied to the option hydraulic actuator, and here there are problems to be solved by the present invention.

Means for Solving the Problem

The present invention has been created with an object of solving these problems in view of the above circumstances, and a Claim 1 of the present invention provides a hydraulic control system in a working machine equipped with an option control circuit that is shared for a plurality of option hydraulic actuators that is selectively mounted in the working machine, the option control circuit further comprising: option control valves for performing oil supply and discharge control to and from the option hydraulic actuators; a pair of actuator oil passages that connect the option control valve and the option hydraulic actuator; a pressure detecting means for detecting pressures of the actuator oil passages; a pressure compensating valve which is disposed on an upstream-side of the option control valve and is actuated in order to maintain a differential pressure, by an inlet-side pressure and an outlet-side pressure of the option control valve being introduced, between the introduced inlet-side pressure and outlet-side pressure at a predetermined pressure; a control device for controlling an actuation of the option control valves; as well as wherein the option control circuit is configured such that, by connecting a variable relief valve capable of varying a relief setting pressure in response to control signals from the control device, to a load pressure introducing oil passage that introduces the outlet-side pressure of the option control valves to the pressure compensating valve, and lowering a pressure of the load pressure introducing oil passage down to a relief setting pressure by the variable relief valve and introducing the pressure to the pressure compensating valve, the pressure of the inlet-side of the option control valves can be variably controlled in accordance with change of the relief setting pressure of the variable relief valve; on the other hand, wherein the option control circuit is configured such that, by providing a load pressure relief position at which oil supply and discharge to and from the option hydraulic actuators is not performed, but the pressure of the actuator oil passage is allowed to flow into the load pressure introducing oil passage, in a switching position of the option control valves, and by switching the option control valve to the load pressure relief position, when the pressure in the actuator oil passage exceeds the upper limit pressure that is preset depending on individual optional hydraulic actuator during non-operation of an option operation lever; as well as by controlling the relief setting pressure of the variable relief valve so as to be less than or equal to the upper limit pressure, the pressure in the actuator oil passage exceeding the upper limit pressure is released to an oil tank via the optional control valve, the load pressure introducing oil passage, and the variable relief valve.

The invention of Claim 2 provides the hydraulic control system in the working machine according to the Claim 1, wherein the hydraulic control system in the working machine comprises first, second hydraulic pumps serving as hydraulic supply sources for other hydraulic actuators to be provided in the working machine other than the option hydraulic actuators, wherein the option hydraulic actuator uses either one or both of these first, second hydraulic pumps as the hydraulic supply sources; as well as wherein the option control circuit comprises first, second option supply oil passages connected to the first, second hydraulic pumps respectively, and an option merging oil passage that allows these first, second option supply oil passages to be merged thereinto, wherein the pressure compensating valve and the option control valve are disposed in the option merging oil passage.

The invention of Claim 3 provides the hydraulic control system in the working machine according to the Claim 2, wherein the hydraulic control system in the working machine is configured to comprise first, second bleed valves for controlling a bleed flow rate that flows into an oil tank from the first, second hydraulic pumps in response to control signals output from the control device, and to control discharge pressures of the first, second hydraulic pumps in accordance with bleed flow rate control by the first, second bleed valves; as well as the control device performs bleed flow rate control so that, in case where the option hydraulic actuator uses either one of these first, second hydraulic pumps as the hydraulic supply source, the discharge pressure of one hydraulic pump serving as the hydraulic supply source will be set higher than discharge pressure of another hydraulic pump not serving as the hydraulic supply source; when the option hydraulic actuator uses both the first, second hydraulic pumps as the hydraulic supply sources, the discharge pressures of the first, second hydraulic pumps will be equalized.

Favorable Effects of the Invention

According to the invention of Claim 1, the upper limit pressure of supply pressurized oil to the optional hydraulic actuator can be variably controlled so as to become a pressure corresponding to individual option hydraulic actuator without installing a variable relief valve in a pair of actuator oil passages respectively; as well as the pressure in the actuator oil passage during non-operation of the option operation lever can be controlled so as not to exceed the upper limit pressure set depending on individual option hydraulic actuator.

According to the invention of Claim 2, even if the option hydraulic actuator uses or relies on only the first hydraulic pump, or only the second hydraulic pump, or both the hydraulic pumps as hydraulic supply source, whichever the case may be, oil supply and discharge control to and from the option hydraulic actuator can be performed by only one option control valve disposed in the option merging oil passage, thereby enabling contribution to a reduction in the number of parts.

According to the invention of Claim 3, the option hydraulic actuator uses or relies on either one of the first, second hydraulic pumps as hydraulic supply source, without separately providing valves for opening and closing the first and second option supply oil passages. Even if both hydraulic pumps are used as hydraulic supply sources, only the supply pressurized oil from the hydraulic pump serving as the hydraulic supply source can be supplied to the option merging oil passage, thereby achieving reduction of the number of parts and cost reduction.

DETAILED DESCRIPTION OF THE INVENTION

Hereinbelow, embodiments of the present invention will be discussed with reference to the drawings.

Figure 1:
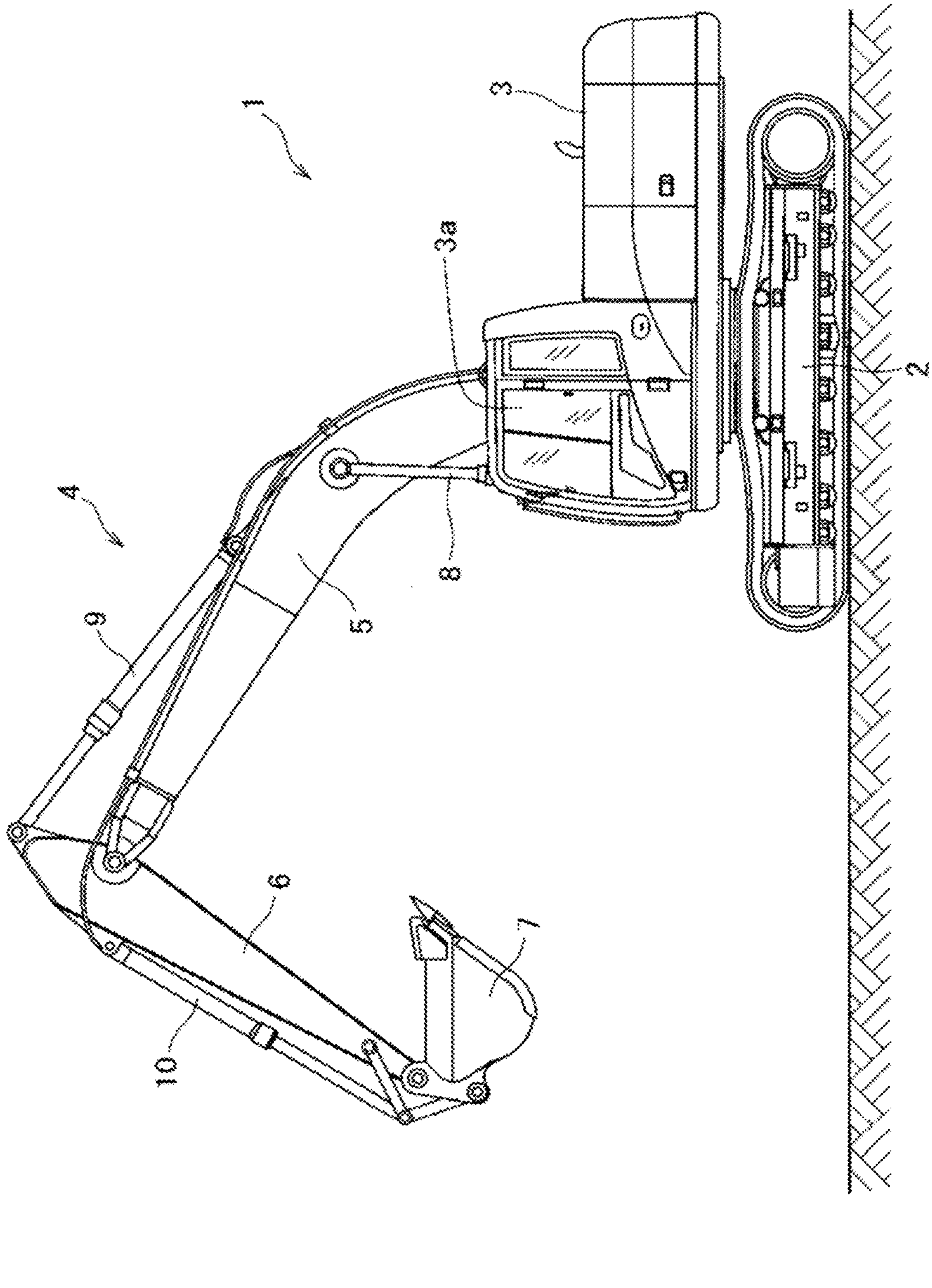
FIG. 1 is a side view of a hydraulic shovel.

FIG. 1 is a view illustrating a hydraulic shovel 1 which is an example of a working machine provided with a hydraulic control system of the present invention. The hydraulic shovel 1 is constituted of a lower traveling structure 2 of crawler type; an upper slewing structure 3 that is supported so as to slew freely above the lower traveling structure 2; and a working implement 4 that is mounted on the upper slewing structure 3, and other parts. Further the working implement 4 is constituted of a boom 5 whose base end portion is supported so as to swing freely upwardly and downwardly on the upper slewing structure 3; a stick 6 that is supported so as to swing freely backwardly and forwardly at the tip end portion of the boom 5; a bucket 7 that is attached so as to swing freely to the tip end portion of the stick 6, and others; as well as the hydraulic shovel 1 is equipped with various types of hydraulic actuators including a boom cylinder 8, a stick cylinder 9, a bucket cylinder 10 for causing the boom 5, the stick 6, the bucket 7 to swing, respectively, and left and right traveling motors (not illustrated) for causing the lower traveling structure 2 to travel, a slewing motor 11 (illustrated in FIG. 2) for causing the upper slewing structure 3 to slew. Furthermore, the hydraulic shovel 1 is adapted such that various hydraulically operated option tools (option attachments) including breaker, a crusher, a grapple, a tilt bucket, a rotary cutting attachment (all not illustrated) can be mounted selectively in place of the bucket 7, depending on their work contents. If an option tool is mounted, the bucket cylinder 10 operates as a hydraulic cylinder for causing the option tool to swing with respect to the stick 6.

Figure 2:
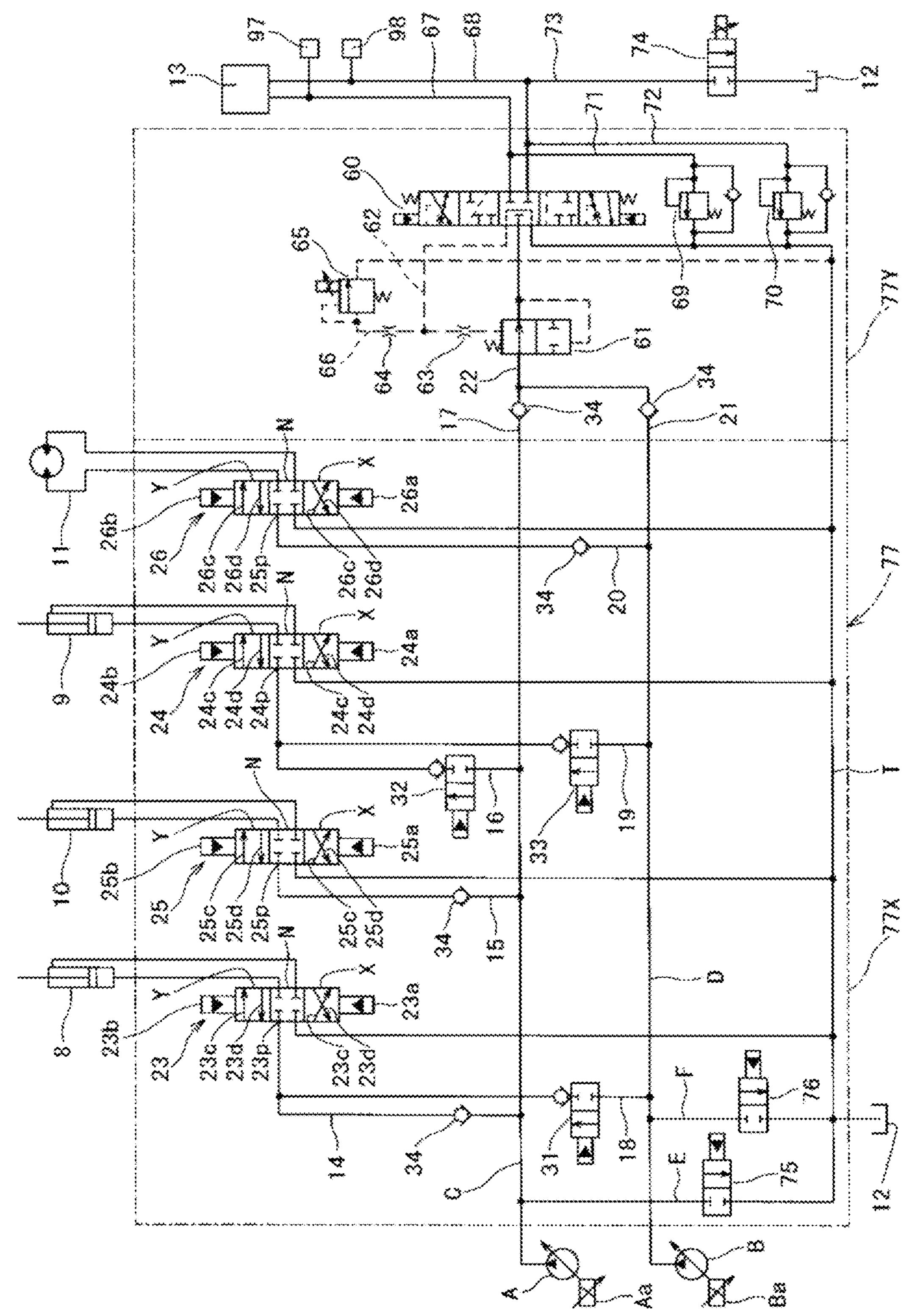
FIG. 2 is a hydraulic circuit diagram of a hydraulic shovel.

Next, a hydraulic control system provided in the hydraulic shovel 1 will be discussed with reference to the hydraulic circuit diagram illustrated in FIG. 2. In FIG. 2, the hydraulic circuit of the portion relating to the traveling motor is omitted.

In FIG. 2, reference symbols A, B denote a first, a second hydraulic pumps of variable displacement type; Aa, Ba denote a displacement varying means for varying the displacements of the first, second hydraulic pumps A, B; and reference numeral 12 denotes an oil tank. 8, 9, 10, 11 denote the boom cylinder, the stick cylinder, the bucket cylinder, the slewing motor, which are hydraulic actuators permanently mounted in the hydraulic shovel 1. Further, 13 denotes an option hydraulic actuator, and the option hydraulic actuator 13 is a hydraulic actuator equipped in the option tool in order to drive the option tool that is selectively mounted to the hydraulic shovel 1; for example, a breaker hydraulic actuator (hereinafter simply referred to as a breaker) when the breaker is mounted as an option tool, and a grapple hydraulic actuator when a grapple is mounted. In the present embodiment, the boom cylinder 8 and the stick cylinder 9 are configured to use both the first, second hydraulic pumps A, B as hydraulic supply sources; the bucket cylinder 10 to use the first hydraulic pump A as a hydraulic supply source; and the slewing motor 11 to use the second hydraulic pump B as a hydraulic supply source. Further, the option hydraulic actuator 13 as described below, is configured to use either one or both of the first, second hydraulic pumps A, B as a hydraulic supply source, depending on the flow rate required by the option hydraulic actuator 13 and on whether the option hydraulic actuator 13 performs independent operation or combined operation (simultaneous operation) with the other hydraulic actuators. In the present embodiment, the boom cylinder 8, the stick cylinder 9, the bucket cylinder 10, and the slewing motor 11 correspond to the other hydraulic actuators of the present invention.

Moreover, in FIG. 2, reference symbol C denotes a first pump line connected to the discharge side of the first hydraulic pump A; and a first boom supply oil passage 14, a first bucket supply oil passage 15, a first stick supply oil passage 16, and a first option supply oil passage 17 are connected to the first pump line C in a state where they are parallel with each other. D denotes a second pump line connected to the discharge side of the second hydraulic pump B, and a second boom supply oil passage 18, a second stick supply oil passage 19, a second slewing supply oil passage 20, and a second option supply oil passage 21 are connected to the second pump line D in a state where they are parallel with each other. The first, second boom supply oil passages 14, 18 are oil passages connecting respectively the first, second hydraulic pumps A, B to a boom control valve 23 described below. The first bucket supply oil passage 15 is an oil passage connecting the first hydraulic pump A to a bucket control valve 25. The first, second stick supply oil passages 16, 19 are oil passages connecting the first, second hydraulic pumps A, B to a stick control valve 24. The second slewing supply oil passage 20 is an oil passage connecting the second hydraulic pump B to a slewing control valve 26. The first, second option supply oil passages 17, 21 are oil passages connecting respectively the first, second hydraulic pumps A, B to an option merging oil passage 22 described below.

Figure 9:
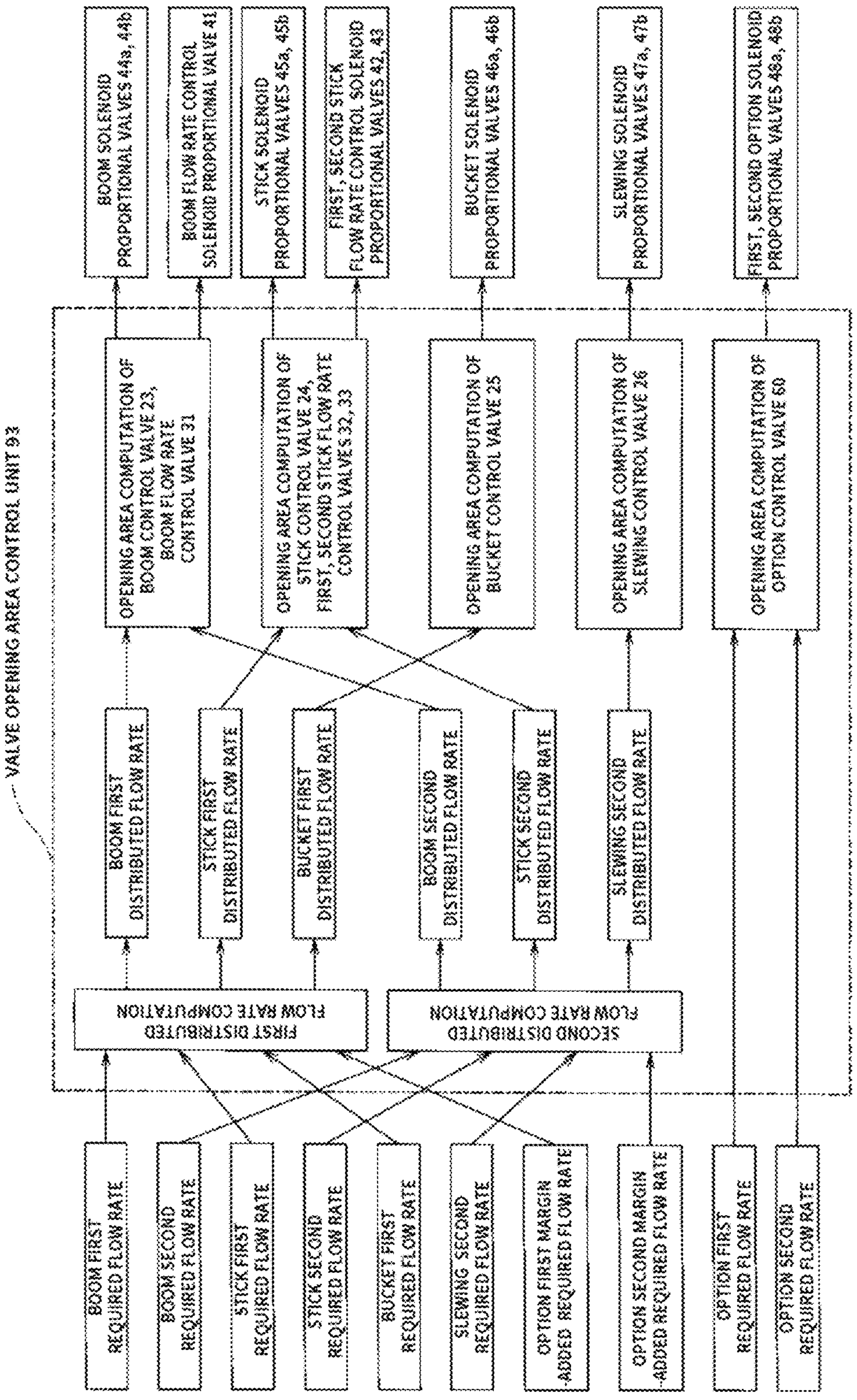
FIG. 9 is a control block diagram of a valve opening area control unit.

A boom flow rate control valve 31 for controlling the supply flow rate from the second hydraulic pump B to the boom control valve 23 is disposed in the second boom supply oil passage 18; and a first, a second stick flow rate control valves 32, 33 for controlling the supply flow rates from the first, second hydraulic pumps A, B to the stick control valve 24 are disposed in the first, second stick oil supply passages 16, 19. The boom flow rate control valve 31, the first, second stick flow rate control valves 32, 33 serve as poppet valves that perform flow rate control by being pilot-operated by a boom flow rate control solenoid proportional valve 41; first, second stick flow rate control solenoid proportional valves 42, 43 (all illustrated in FIGS. 5 and 9) that are actuated in response to control signals output from a controller 30, and have a backflow prevention function, thereby enabling adaption to allow for the flow of oil from the first, second hydraulic pumps A, B to the boom control valve 23, the stick control valve 24, but to block off the backflow.

On the other hand, in the first boom supply oil passage 14, the first bucket supply oil passage 15, the second slewing supply oil passage 20, the first, second option supply oil passages 17, 21, there are disposed no flow rate control valves like the boom flow rate control valve 31, the first, second stick flow rate control valves 32, 33 described above; and pressurized oil from the first hydraulic pump A or the second hydraulic pump B via the first boom supply oil passage 14, the first bucket supply oil passage 15, the second slewing supply oil passage 20, the first, second option supply oil passages 17, 21 is supplied directly to the boom control valve 23, the bucket control valve 25, the slewing control valve 26, the option merging oil passage 22 without the flow rate being controlled. A check valve 34 is disposed in each of the first boom supply oil passage 14, the first bucket supply oil passage 15, the second slewing supply oil passage 20, the first, second option supply oil passages 17, 21, and is adapted to allow for the flow of oil from the first, second hydraulic pumps A, B into the boom control valve 23, the bucket control valve 25, the slewing control valve 26, the option merging oil passage 22, but to block off the backflow.

Thus, pressurized oil from the first hydraulic pump A via the first boom supply oil passage 14, and pressurized oil from the second hydraulic pump B via the second boom supply oil passage 18 can be supplied to a pump port 23*p* of the boom control valve 23; as well as the pressurized oil from the second hydraulic pump B will be supplied to the boom control valve 23 in a state where (including the shut-off state) its flow rate is controlled by the boom flow rate control valve 31 disposed in the second boom supply oil passage 18. Also, the pressurized oil from the first hydraulic pump A via the first stick supply oil passage 16 and the pressurized oil from the second hydraulic pump B via the second stick supply oil passage 19 can be supplied to the pump port 24*p* of the stick control valve 24; as well as the pressurized oil from the first, second hydraulic pumps A, B will be supplied to the stick control valve 24 in a state where (including the shut-off state) its flow rate is controlled by the first, second stick flow rate control valves 32, 33 disposed respectively in the first, second stick supply oil passages 16, 19.

The boom, the stick, the bucket, the slewing control valves 23 to 26, which are spool valves of closed center type that control the supply and discharge flow rate to and from the boom cylinder 8, the stick cylinder 9, the bucket cylinder 10, the slewing motor 11 as well as switches between the supply/discharge directions, includes a pair of pilot ports 23*a*, 23*b* to 26*a*, 26*b*, connected respectively to a boom, a stick, a bucket, a slewing solenoid proportional valves 44*a*, 44*b* to 47*a*, 47*b* (illustrated in FIGS. 5 and 9) that outputs a pilot pressure in response to control signals from the controller 30; supply valve passages 23*c* to 26*c* that allow for the supply of pressurized oil from the first or/and second hydraulic pumps A, B to the boom cylinder 8, the stick cylinder 9, the bucket cylinder 10, the slewing motor 11; discharge valve passages 23*d* to 26*d* that allow for the flow of discharged oil from the boom cylinder 8, the stick cylinder 9, the bucket cylinder 10, the slewing motor 11 into a tank line T extending to the oil tank 12. The boom, stick, the bucket, the slewing control valves 23 to 26 are configured to be positioned at a neutral position N where to close the supply valve passages 23*c* to 26*c* and the discharge valve passages 23*d* to 26*d* and not to perform supply and discharge control to and from corresponding hydraulic actuators (the boom cylinder 8, the stick cylinder 9, the bucket cylinder 10, the slewing motor 11) in a state where a pilot pressure is not input to both the pilot ports 23*a*, 23*b* to 26*a*, 26*b*, but to be switched to an actuation position X or Y where to open the supply valve passages 23*c* to 26*c* and the discharge valve passages 23*d* to 26*d*, to perform the supply and discharge control to and from the hydraulic actuators, by a pilot pressure being input to one or another pilot ports 23*a*, 23*b* to 26*a*, 26*b*. Then, the opening areas of the supply valve passages 23*c* to 26*c* and the discharge valve passages 23*d* to 26*d* when positioned at the actuation position X or Y is controlled to increase or decrease depending on a travel stroke of spool associated with an increase or decrease of a pilot pressure output from the boom, the stick, the bucket, the slewing solenoid proportional valves 44*a*, 44*b* to 47*a*, 47*b* to the pilot ports 23*a*, 23*b* to 26*a*, 26*b* of the boom, the stick, the bucket, the slewing control valves 23 to 26.

Then, the supply flow rate and discharge flow rate to and from the bucket cylinder 10, the slewing motor 11 are controlled in accordance with an opening area of the supply valve passages 25*c*, 26*c*, the discharge valve passages 25*d*, 26*d* of the bucket, the slewing control valves 25, 26.

Further, the supply flow rate to the boom cylinder 8 is controlled in accordance with an opening area of the supply valve passage 23*c* of the boom control valve 23, regarding the supply flow rate from the first hydraulic pump A via the first boom supply oil passage 14 provided with no flow rate control valve; on the other hand, regarding the supply flow rate from the second hydraulic pump B via the second boom supply oil passage 18 provided with the boom flow rate control valve 31, the supply flow rate to the boom cylinder 8 becomes "zero" in a state where the boom flow rate control valve 31 is closed, and in a state where the boom flow rate control valve 31 is open, the supply flow rate to the boom cylinder 8 is controlled in accordance with an opening area of the boom flow rate control valve 31 and an opening area of the supply valve passage 23*c* of the boom control valve 23. On the other hand, the discharge flow rate from the boom cylinder 8 is controlled in accordance with an opening area of the discharge valve passage 23*d* of the boom control valve 23.

Also, the supply flow rate to the stick cylinder 9, regarding the supply flow rate from the first hydraulic pump A via the first stick supply oil passage 16 provided with the first stick flow rate control valve 32, becomes "zero" in a state where the first stick flow rate control valve 32 is closed; and is controlled in accordance with an opening area of the first stick flow rate control valve 32 and an opening area of the supply valve passage 24*c* of the stick control valve 24 in a state where the first stick flow rate control valve 32 is open; on the other hand, regarding the supply flow rate from the second hydraulic pump B via the second stick supply oil passage 19 provided with the second stick flow rate control valve 33, the supply flow rate to the stick cylinder 9 becomes "zero" in a state where the second stick flow rate control valve 33 is closed, and in a state where the second stick flow rate control valve 33 is open, and is controlled in accordance with an opening area of the second stick flow rate control valve 33, and an opening area of the supply valve passage 24*c* of the stick control valve 24. On the other hand, the discharge flow rate from the stick cylinder 9 will be controlled in accordance with an opening area of the discharge valve passage 24*d* of the stick control valve 24.

On the other hand, the option merging oil passage 22 serves as an oil passage formed by the downstream side of the first option supply oil passage 17 connected to the first hydraulic pump A and the downstream side of the second option supply oil passage 21 connected to the second hydraulic pump B being merged thereinto, and in the option merging oil passage 22, there are disposed an option control valve 60 described below and a compensator valve 61 (which corresponds to the pressure compensating valve of the present invention) located on the upstream-side of the option control valve 60.

Figure 3:
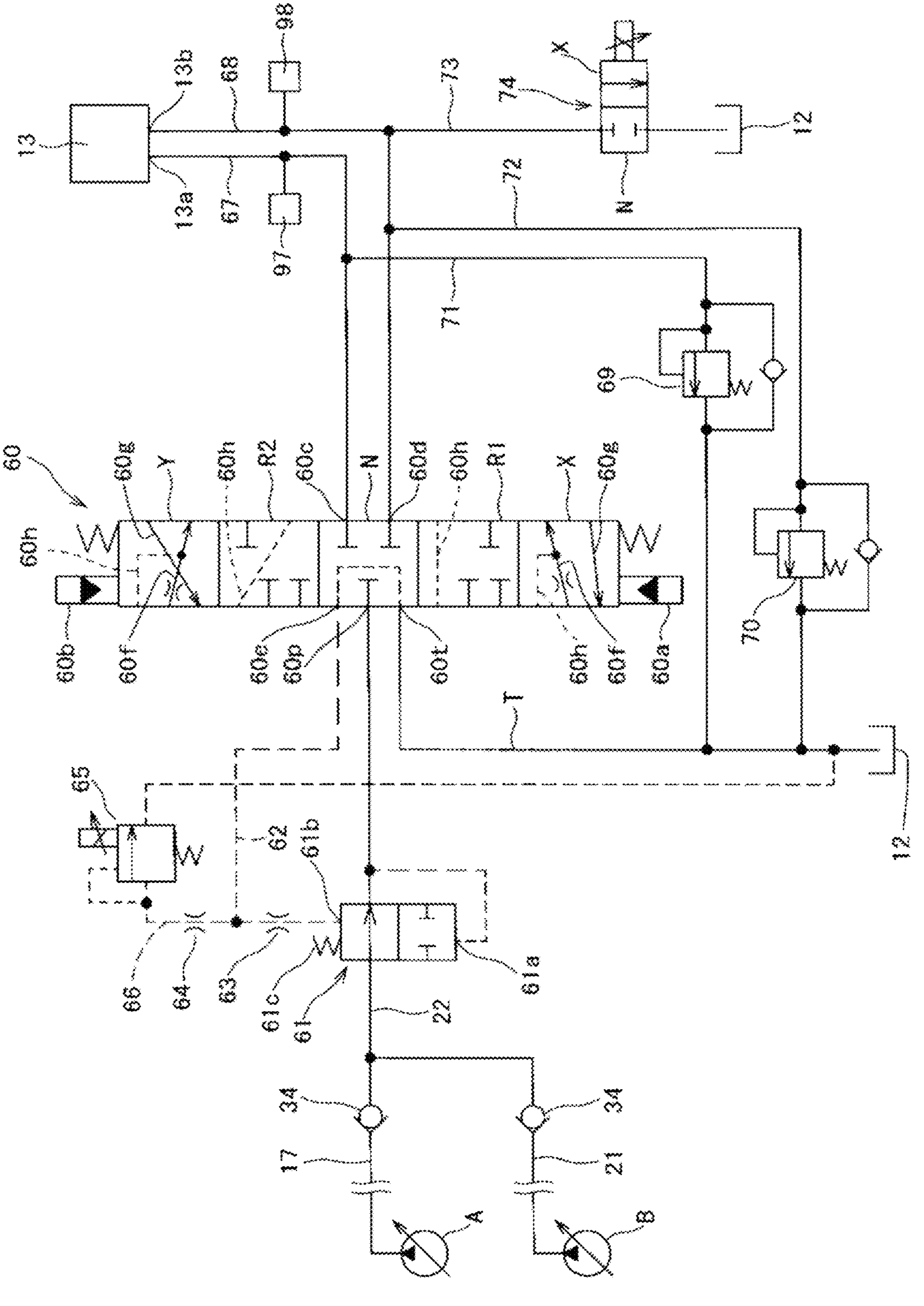
FIG. 3 is an enlarged view of an option control circuit associated with an option hydraulic actuator.

The option control valve 60, which is a spool valve of closed center type that controls the supply and discharge flow rate to and from the option hydraulic actuator 13 as well as switches between the supply and discharge directions, as illustrated in the enlarged hydraulic circuit diagram of FIG. 3, includes first, second pilot ports 60*a*, 60*b* respectively connected to first, second option solenoid proportional valves 48*a*, 48*b* (illustrated in FIGS. 5 and 9) that output pilot pressure in response to control signals output from the controller 30; a pump port 60*p* connected to the option merging oil passage 22; a tank port 60*t* connected to the tank line T; a first actuator port 60*c* connected via a first hydraulic actuator oil passage 67 to one port 13*a* of the option hydraulic actuator 13; a second actuator port 60*d* connected via a second hydraulic actuator oil passage 68 to an another port 13*b* of the option hydraulic actuator 13; and a load pressure output port 60*e* connected to a second pilot port 61*b* of the compensator valve 61 described below via a load pressure introducing oil passage 62. Then, the option control valve 60, is configured, in a state where no pilot pressure is being input to both the first, second pilot ports 60*a*, 60*b*, to be positioned at the neutral position N where to close the pump port 60*p*, the first and second actuator ports 60*c*, 60*d*, not to perform the supply and discharge control to and from the option hydraulic actuator 13, and to cause the load pressure output port 60*e* to communicate with the tank port 60*t*; but by a pilot pressure being input to the first pilot port 60*a*, causing the spool to be moved in one direction, to be positioned at a first load pressure relief position R1 or a first actuation position X, and by a pilot pressure being input to the second pilot port 60*b*, causing the spool to be moved in another direction, to be positioned at a second first load pressure relief position R2 or a second actuation position Y. The first, second hydraulic actuator oil passage 67, 68 are oil passages that connects the option control valve 60 and the option hydraulic actuator 13, which correspond to an actuator oil passage of the present invention.

The first, second actuation positions X, Y of the option control valve 60 are regions where a travel stroke of spool from the neutral position N is greater than that of the first, second load pressure relief positions R1, R2 (regions where the pilot pressure to be input to the first, second pilot ports 60*a* and 60*b* is greater than that of the first, second load pressure relief positions R1, R2), and the option control valve 60 is configured, at the first operating position X, to open a supply valve passage 60*f* extending from the pump port 60*p* to the first actuator port 60*c*; a discharge valve passage 60*g* extending from the second actuator port 60*d* to the tank port 60*t*; and a load pressure valve passage 60*h* extending from the first actuator port 60*c* to the load pressure output port 60*e*; and at the second operating position Y, to open a supply valve passage 60*f* extending from the pump port 60*p* to the second actuator port 60*d*; a discharge valve passage 60*g* extending from the first actuator port 60*c* to the tank port 60*t*; and a load pressure valve passage 60*h* extending from the second actuator port 60*d* to the load pressure output port 60*e*. Then, the opening areas of the supply valve passage 60*f* and the discharge valve passage 60*g* are adapted to be controlled to increase or decrease in proportion to the travel stroke of the spool moved by the pilot pressure output from first, second option solenoid proportional valves 48*a*, 48*b*; as well as the supply flow rate, discharge flow rate to and from the option hydraulic actuator 13 are adapted to be controlled in accordance with the opening areas of the supply valve passage 60*f*, the discharge valve passage 60*g*, respectively. Further, the option control valve 60 at the first, second operating positions X, Y is adapted such that, by the load pressure valve passage 60*h* being opened, the outlet-side pressure of the option control valve 60 (the load pressure of the option hydraulic actuator 13, the pressure of the first or second hydraulic actuator oil passages 67, 68 supplied with pressurized oil from the supply valve passage 60*f*) is introduced into the load pressure introducing oil passage 62.

On the other hand, the first, second load pressure relief positions R1, R2 of the option control valve 60 are regions where the travel stroke of spool from the neutral position N is smaller than that of the first, second actuation positions X, Y (regions where pilot pressures input to the first, second pilot ports 60*a*, 60*b* are smaller than pressures at the first, second operating positions X, Y). The option control valve 60 is adapted, on the other hand, at the first load pressure relief position R1, to close the pump port 60*p*, the tank port 60*t* and the second actuator port 60*d*, to open the load pressure valve passage 60*h* extending from the first actuator port 60*c* to the load pressure output port 60*e*; and at the second load pressure relief position R2, to close the pump port 60*p*, the tank port 60*t* and the first actuator port 60*c*; on the other hand, to open the load pressure valve passage 60*h* extending from the second actuator port 60*d* to the load pressure output port 60*e*. In other words, when the option control valve 60 is positioned at the first, second load pressure relief positions R1, R2, the supply valve passage 60*f* (valve passage extending from the pump port 60*p* to first or second actuator ports 60*c*, 60*d*) for supplying pressurized oil from the first, second hydraulic pumps A, B via the option merging oil passage 22 to the option hydraulic actuator 13, and the flow discharge valve passage 60*g* (valve passage extending from the second or first actuators 60*d*, 60*c* to the tank port 60*t*) for causing discharged oil from the option hydraulic actuator 13 to flow into oil tank 12 are closed, and the option control valve 60 does not perform oil supply and discharge to and from the option hydraulic actuator 13, but is adapted to enable pressurized oil of the first or second hydraulic actuator oil passages 67, 68 to flow into the load pressure introducing oil passage 62, by opening the load pressure valve passage 60*h* extending from the first or second actuator ports 60*c*, 60*d* to the load pressure output port 60*e*.

Figure 4A:
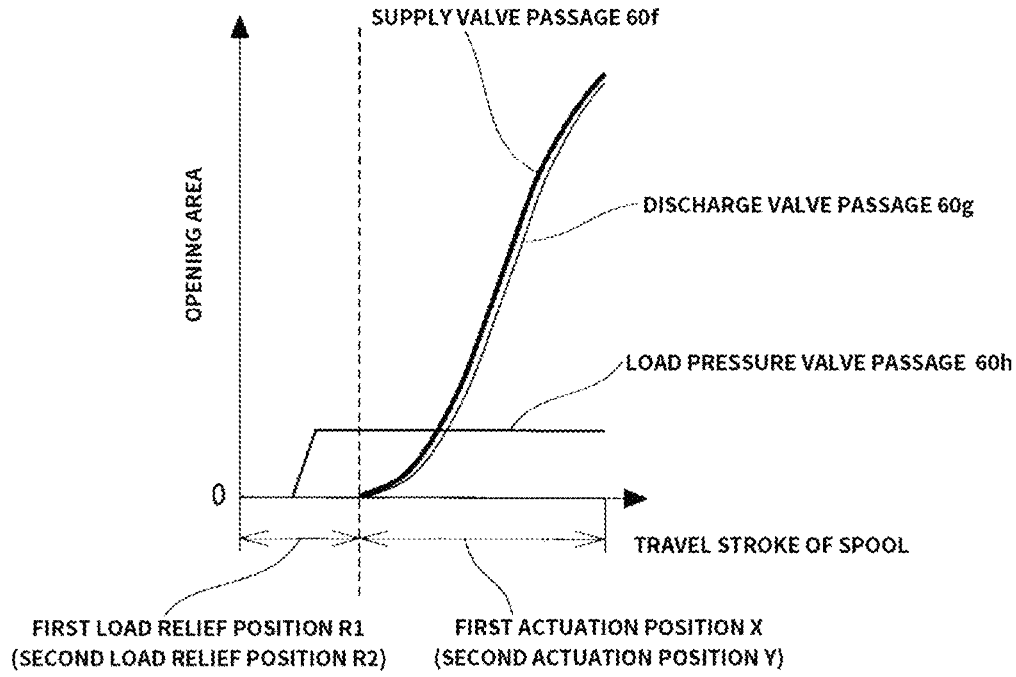
FIG. 4(A) is a diagram illustrating a relationship between travel strokes of spool of an option control valve positioned at first, second load pressure relief positions; first, second actuation positions and opening areas of a supply valve passage, a discharge valve passage, a load pressure valve passage.

Now, FIG. 4(A) illustrates one example of relationship between travel stroke of spool when the option control valve 60 is positioned at the first or second load pressure relief positions R1, R2, the first or second operating positions X, Y, and opening area of the supply valve passage 60*f*, the discharge valve passage 60*g*, the load pressure valve passage 60*h*. As illustrated in FIG. 4(A), when positioned at the first or second load pressure relief positions R1, R2, the supply valve passage 60*f* and the discharge valve passage 60*g* are closed; as well as the load pressure valve passage 60*h* is adapted to be opened by the travel stroke of spool exceeding a dead zone. On the other hand, when the first or second operating position X, Y is reached, the supply valve passage 60*f* and the discharge valve passage 60*g* are opened, and its opening area is adapted to increase with an increase of the travel stroke of spool. Further, the load pressure valve passage 60*h* when positioned at the first or second actuation positions X, Y is adapted to maintain an opening area opened at the first or second load pressure relief positions R1, R2, but the opening area is smaller compared to a maximum opening area of the supply valve passage 60*f*, the discharge valve passage 60*g*.

By the way, as the option hydraulic actuator 13, there are various kinds including ones whose pressurized oil supply direction is one direction like a one-direction rotary motor or a single-acting cylinder (e.g. breakers), ones whose pressurized oil supply direction is bi-direction like a bi-directional rotary motor or a double-acting cylinder (e.g. crushers), ones requiring a large flow rate (e.g. large-sized breakers and crushers), and ones requiring only a small flow rate (e.g. small-sized breakers and crushers), and the option control valve 60 shares the use of the option hydraulic actuator 13 available in various types. In other words, switching the option control valve 60 between the first actuation position X and the second actuation position Y enables performing bi-directional supply of pressurized oil to the option hydraulic actuator 13; and using only either one actuation position of the first actuation positions X and the second actuation positions Y enables performing one-directional supply of pressurized oil; but in the present embodiment, the use of the first actuation positions X is set, in case of performing one-directional supply of pressurized oil.

On the other hand, the load pressure introducing oil passage 62 serves as an oil passage extending from the load pressure output port 60*e* of the option control valve 60 to the second pilot port 61*b* of the compensator valve 61. In the load pressure introducing oil passage 62 is disposed a first throttle 63; as well as a load pressure relief oil passage 66 extending to the tank line T via a second throttle 64 and a variable relief valve 65 is branched and formed from the load pressure introducing oil passage 62 extending from the load pressure output port 60*e* of the option control valve 60 to the first throttle 63. The variable relief valve 65 serve as an solenoid proportional relief valve capable of changing a relief setting pressure LP in response to control signals from the controller 30, and is adapted to lower a load pressure to be input to the second pilot port 61*b* of the compensator valve 61 down to the relief setting pressure LP, by a load pressure that has been introduced into the load pressure introducing oil passage 62 being released into the oil tank 12 via the variable relief valve 65, in case where the relief setting pressure LP of the variable relief valve 65 is lower than a load pressure of the option hydraulic actuator 13 to be introduced into the load pressure introducing oil passage 62.

The compensator valve 61 includes a first pilot port 61*a* to which a first pilot pressure that presses the valve body of the compensator valve 61 to a closed side is input; and a second pilot port 61*b* to which a second pilot pressure that presses the valve body to an open side is input; and a spring 61*c* that presses to the open side, and an opening area is controlled such that a differential pressure between the first pilot pressure and the second pilot pressure is held at a predetermined pressure K that is determined by the spring 61*c*. Then, the first pilot port 61*a* of the compensator valve 61 is connected to an option merging oil passage 22 on the inlet-side of the option control valve 60, and a pressure of the option merging oil passage 22 is input thereto. Further, the second pilot port 61*b* is connected to the load pressure introducing oil passage 62, and when a load pressure of the option hydraulic actuator 13 is less than or equal to the relief setting pressure LP of the variable relief valve 65, the load pressure of the option hydraulic actuator 13 is adapted to be input; on the other hand, the load pressure of the option hydraulic actuator 13 is higher than the relief setting pressure LP, a load pressure reduced to the relief setting pressure LP as described above is adapted to be input. Thus, when a load pressure of the option hydraulic actuator 13 is less than or equal to the relief setting pressure LP, in a state where the option control valve 60 is positioned at the first, second actuation positions, positioned at the first, second actuation positions X, Y, and oil supply and discharge to and from the option hydraulic actuator 13 is performed, a pressure PO of the option merging oil passage 22 is controlled so as to be higher than the load pressure of the option hydraulic actuator 13 by the predetermined pressure K due to the action of the compensator valve 61; on the other hand, when the load pressure of the option hydraulic actuator 13 is higher than the relief setting pressure LP, the pressure PO of the option merging oil passage 22 is controlled so as to be higher than the relief setting pressure LP by the predetermined pressure K. Accordingly, by variably controlling the relief setting pressure LP of the variable relief valve 65 in response to control signals from the controller 30, the pressure PO of the option merging oil passage 22 on the inlet-side of the option control valve 60 can be controlled so as to be a pressure less than or equal to (LP+K)(PO≤(LP+K)), which is higher than the relief setting pressure LP by the predetermined pressure K.

On the other hand, in a state where the option control valve 60 is positioned at the first, second load pressure relief positions R1, R2, the supply valve passage 60*f* and the discharge valve passage 60*g* are closed, as described above; on the other side, the load pressure valve passage 60*h* for introducing the load pressure of first, the second hydraulic actuator oil passages 67, 68 to the load pressure introducing oil passage 62 is open. Then, when the pressure in the first, second hydraulic actuator oil passages 67, 68 introduced into the load pressure introducing oil passage 62 is higher than the relief setting pressure LP of the variable relief valve 65, the pressurized oil in the first, second hydraulic actuator oil passages 67, 68 flows into the oil tank 12 via the load pressure introducing oil passage 62 and the variable relief valve 65 from the load pressure valve passage 60*h*. Consequently, in a state where the option control valve 60 is positioned at the first, second load pressure relief positions R1, R2, it is configured such that the pressure in the first, second hydraulic actuator oil passages 67, 68 can be reduced to the relief setting pressure LP of the variable relief valve 65.

Moreover, first, second option relief oil passages 71, 72 extending into the tank line T via first, second option relief valves 69, 70 are branched and formed from the first, second hydraulic actuator oil passages 67, 68. The first, second option relief valves 69, 70 are actuated so as to release high pressurized oil to the oil tank 12 when the first, second hydraulic actuator oil passages 67, 68 become high pressure due to dynamic pressure fluctuations such as when a surge pressure is generated due to an external force like a collision, but a relief setting pressure of the first, second option relief valves 69, 70 is set to a driving pressure of the highest pressure among the driving pressures of the option hydraulic actuator 13 selectively mounted to the hydraulic shovel 1. The first, second option relief valves 69, 70 use inexpensive ones that cannot change electrically their relief setting pressure. In addition, the relief valves similar to the first, second option relief valves 69, 70 are provided also in oil passages that connects the boom control valve 23, the stick control valve 24, the bucket control valve 25, the slewing control valve 26, and the boom cylinder 8, the stick cylinder 9, the bucket cylinder 10, the slewing motor 11 respectively, but they are omitted in FIG. 2.

Figure 4B:
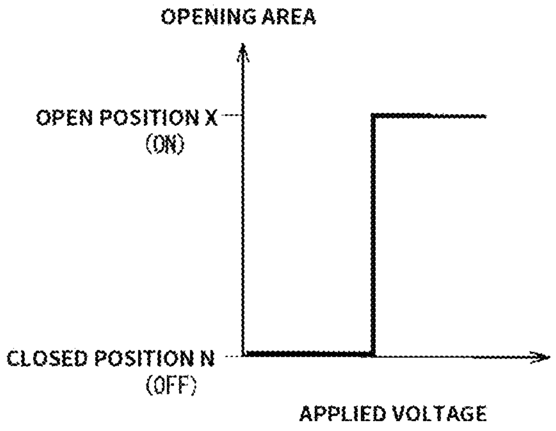
FIG. 4(B) is a diagram illustrating opening area characteristics of a switching valve.

Moreover, in FIGS. 2 and 3, reference numeral 73 denotes a bypass oil passage that is branched and formed from the first or second hydraulic actuator oil passages 67, 68 extending into the oil tank 12. In a bypass oil passage 73 is disposed a switching valve 74. The switching valve 74, as illustrated in FIG. 4(B), is a two-position switching valve that is turned into ON/OFF by an applied voltage from the controller 30 and switched to a closed position N, and an open position X; and switching the switching valve 74 to the open position X is adapted to enable discharged oil from the option hydraulic actuator 13 to flow directly into the oil tank 12 without passing through the discharge valve passage 60*g* of the option control valve 60. Then, when there is mounted an option hydraulic actuator 13 which requires back pressure reduction and has pressurized oil supply direction in one direction like a breaker for example, the back pressure exerted on the option hydraulic actuator 13 is adapted to be reliably reduced by opening the switching valve 74 (switching to the open position X) and allowing the discharged oil from the option hydraulic actuator 13 to flow into the oil tank 12 from the bypass oil passage 73. In addition, the switching valve 74 is an inexpensive one that is switched by ON/OFF as described above, and therefore it is adapted to enable performing the back pressure reduction control at a low cost compared to the case of using the variable relief valve, for example. In addition, when there is mounted an option hydraulic actuator 13 having pressurized oil supply direction in one direction and requiring the back pressure reduction, the bypass oil passage 73 is branched and formed from an actuator oil passage serving as a return oil passage from the option hydraulic actuator 13. In the present embodiment, the bypass oil passage 73 is branched and formed from a second hydraulic actuator oil passage 68; but when a first hydraulic actuator oil passage 67 serves as the return oil passage from the option hydraulic actuator 13, the bypass oil passage 73 is branched and formed from the first hydraulic actuator oil passage 67.

Moreover, in FIG. 2, E, F denote first, second bleed lines branched and formed respectively from upstream-side positions of all the supply oil passages 14 to 21 connected to the first, second pump lines C, D, extending into the tank line T. In a first, a second bleed valves 75, 76 are disposed the first, second bleed lines E, F respectively. These first, second bleed valves 75, 76 are actuated by a pilot pressure output from first, second bleed solenoid proportional valves 49*a*, 49*b* (illustrated in FIGS. 5 and 10) to increase or decrease the opening area, and thereby being adapted to control so as to increase or decrease a bleed flow rate flowing from the first, second hydraulic pumps A, B via the first, second bleed lines E, F into the oil tank 12. Then, the pressure of the first, second pump lines C, D (discharge pressures of the first, second hydraulic pumps A, B) is adapted to be controlled by the bleed flow rate control by the first, second bleed valves 75, 76.

Moreover, in FIG. 2, 77 denotes a valve block in which are incorporated various types of valves for performing oil supply and discharge control to and from the above-described various types of hydraulic actuators (the boom cylinder 8, the stick cylinder 9, the bucket cylinder 10, the slewing motor 11, the option hydraulic actuator 13). The valve block 77 is formed by an option valve block 77Y incorporating therein various types of valves for controlling the option hydraulic actuator (the option control valve 60, the compensator valve 61, the variable relief valve 65, the first, second option relief valves 69, 70, etc.) being assembled integrally to the main valve block 77X incorporating therein various types of valves for controlling permanently provide hydraulic actuators (the boom, the stick, the bucket, the slewing control valves 23 to 26, the boom, the first, the second stick flow rate control valves 31 to 33, etc.) and the first, second bleed valves 75, 76, etc. The bypass oil passage 73 and a switching valve 74 are provided outside the valve block 77.

Figure 5:
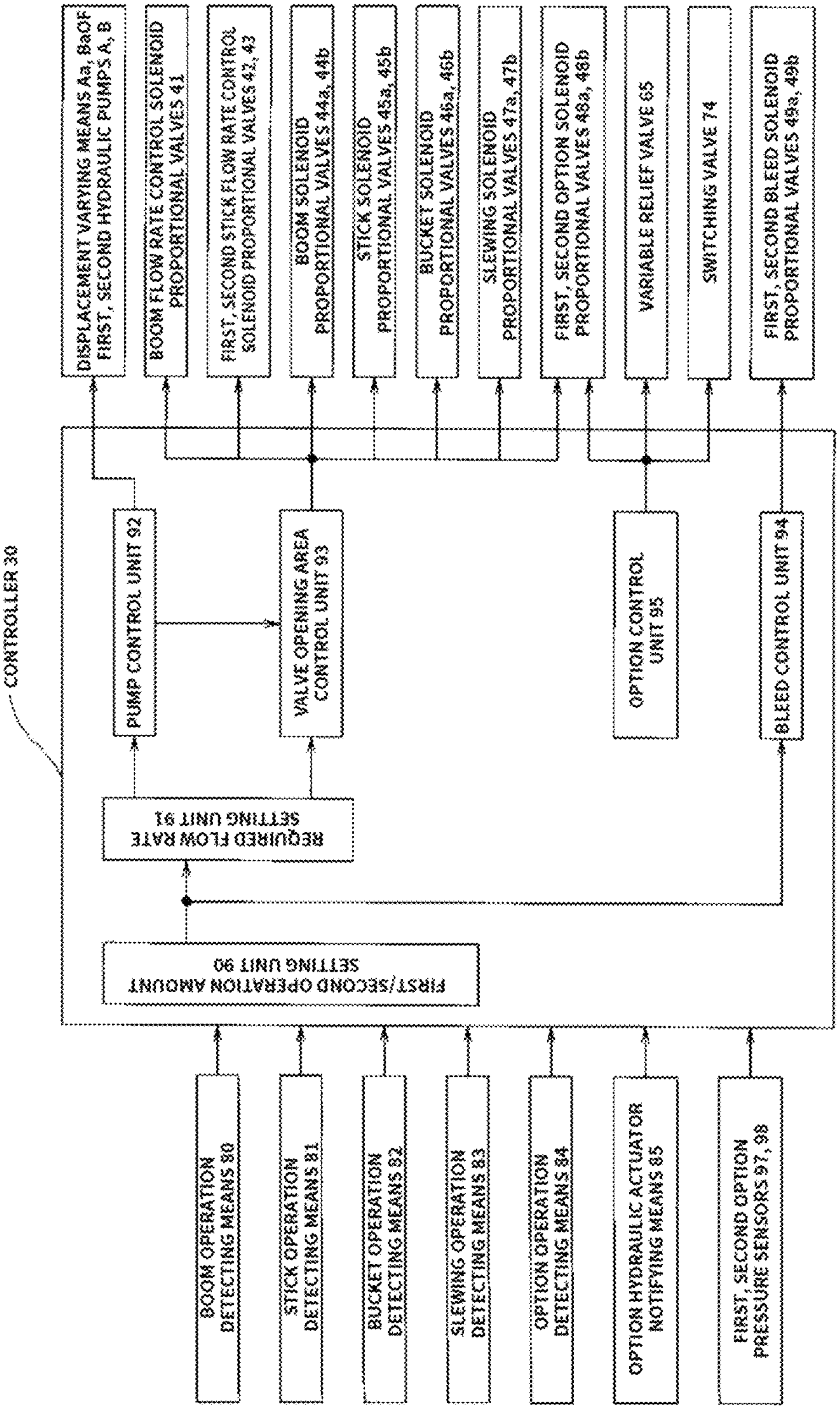
FIG. 5 is a block diagram illustrating the configuration of a controller.

On the other hand, the controller 30 (corresponding to a control means of the present invention), as illustrated in the block diagram of FIG. 5, is configured such that, to its input-side are connected a boom operation detecting means 80, a stick operation detecting means 81, a bucket operation detecting means 82, a slewing operation detecting means 83, an option operation detecting means 84 for detecting an operation direction and an operation amount of a boom operation lever, a stick operation lever, a bucket operation lever, a slewing operation lever, an option operation lever (all not illustrated) respectively; an option hydraulic actuator notifying means 85 described below; pressure sensors (not illustrated) for detecting pump pressures of the first, second hydraulic pumps A, B; pressure sensors (all not illustrated) for detecting load pressures of the boom cylinder 8, the stick cylinder 9, the bucket cylinder 10, the slewing motor 11 respectively; a first, a second option pressure sensors (equivalent to a pressure detecting means for detecting the pressure of the actuator oil passage of the present invention) 97, 98 for detecting the load pressure of the option hydraulic actuator 13 (pressures of the first, second actuator oil passages 67, 68), etc.; and to its output-side are connected the displacement varying means Aa, Ba of the first, second hydraulic pumps A, B; the boom flow rate control solenoid proportional valve 41 for outputting a pilot pressure to the boom flow rate control valve 31; the first, second stick flow rate control solenoid proportional valves 42, 43 for outputting a pilot pressure to the first, second stick flow rate control valves 32, 33 respectively; the boom, the stick, the bucket, the slewing solenoid proportional valves 44*a*, 44*b* to 47*a*, 47*b* for outputting a pilot pressure to the boom, the stick, the bucket, the slewing control valves 23 to 26 respectively; first, second option solenoid proportional valves 48*a*, 48*b* for outputting a pilot pressure to the option control valve 60; first, second bleed solenoid proportional valves 49*a*, 49*b* for outputting a pilot pressure to the first, second bleed valves 75, 76; the variable relief valve 65; the switching valve 74, etc.; as well as discharge flow rate control for the first, second hydraulic pumps A, B; bleed flow rate control for the first, second bleed lines E, F; oil supply and discharge control to and from the boom cylinder 8, the stick cylinder 9, the bucket cylinder 10, the slewing motor 11; oil supply and discharge control, supply pressure control, load pressure relief control, backpressure reduction control with respect to the option hydraulic actuator 13 etc. are performed, in a first/second operation amount setting unit 90, a required flow rate setting unit 91, a pump control unit 92, a valve opening area control unit 93, a bleed control unit 94, an option control unit 95 etc. described below. The option hydraulic actuator notifying means 85 is a means, when the option hydraulic actuator 13 is mounted, for notifying the controller 30 of various types of information such as the type and specification of the option hydraulic actuator 13, or values of option upper limit pressure PU described below. In the present embodiment, a monitor device (not illustrated) disposed in a cab 3*a* of the hydraulic shovel 1 is provided as the option hydraulic actuator notifying means 85, and it is adapted to enable notifying various pieces of information about the option hydraulic actuator 13 to the controller 30 by the operation of the monitor device, and to enable changing various pieces of information. Also, in FIG. 5, the option hydraulic actuator notifying means 85 is provided outside the controller 30, but it is configured to provide at least a part of the information and functions contained in the option hydraulic actuator notifying means 85 within the controller 30.

Next, control performed by a setting unit and a control unit provided in the controller 30 will be discussed.

Figure 6:
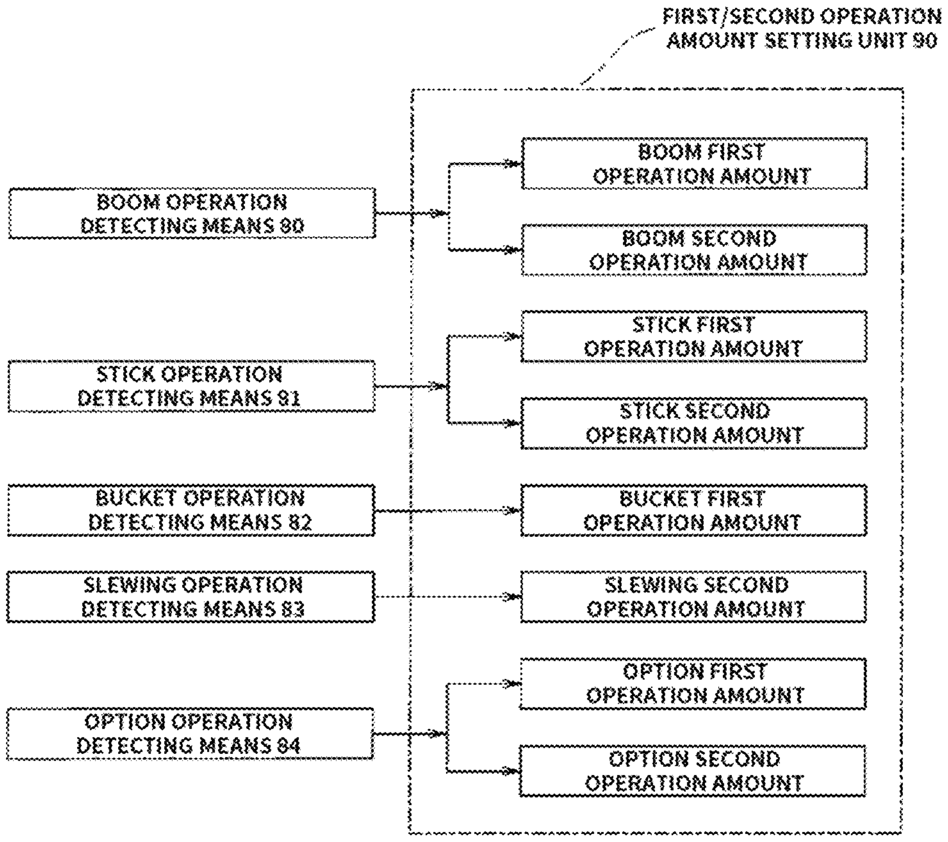
FIG. 6 is a control block diagram of first, second operation amounts setting unit.

The first/second operation amount setting unit 90, when operation signals are input from the boom, the stick, the bucket, the slewing, the option operation detecting means 80 to 84, in response to these operation signals, sets a first operation amount which the first hydraulic pump A serves and a second operation amount which the second hydraulic pump B serves, regarding respective operation amounts of operation levers. The setting of the first, second operation amounts is performed in accordance with pre-stored data, depending on the first, second hydraulic pumps A, B serving as the hydraulic supply sources for operated hydraulic actuators (the boom cylinder 8, the stick cylinder 9, the bucket cylinder 10, the slewing motor 11, the option hydraulic actuator 13), the operation amounts of the operation levers, hydraulic actuators to be combinedly operated (operated simultaneously), the type and specification of the option hydraulic actuator 13. For example, in the present embodiment, since the bucket cylinder 10 uses only the first hydraulic pump A as a hydraulic supply source, only a bucket first operation amount is set when a bucket operation lever is operated; and since the slewing motor 11 uses only the second hydraulic pump B as a hydraulic supply source, only a slewing second operation amount is set when the slewing operation lever is operated. When the boom cylinder 8 is supplied with pressurized oil from both the first, second hydraulic pumps A, B, boom first, second operation amounts are set; but only a first operation amount is set when supplied with pressurized oil from only the first hydraulic pump A. When the stick cylinder 9 is supplied with pressurized oil from both the first, second hydraulic pumps A, B, stick first, second operation amounts are set; but only stick first operation amount is set when supplied with pressurized oil from only the first hydraulic pump A, and only stick second operation amount is set when supplied with pressurized oil from only the second hydraulic pump B. When the option hydraulic actuator 13 is supplied with pressurized oil from both the first, second hydraulic pumps A, B, option first, second operation amounts are set, but when supplied with pressurized oil only from the first hydraulic pumps A, only option first operation amount is set, and when supplied with pressurized oil only from the second hydraulic pumps B, only option second operation amount is set (see FIG. 6). Data for setting the first, second operation amount is stored in the first/second operation amount setting unit 90 as control parameters and is adapted to be changed using the monitor device or the like, depending on work contents performed by the hydraulic shovel 1 and the type and specification of the option hydraulic actuator 13.

Figure 8:
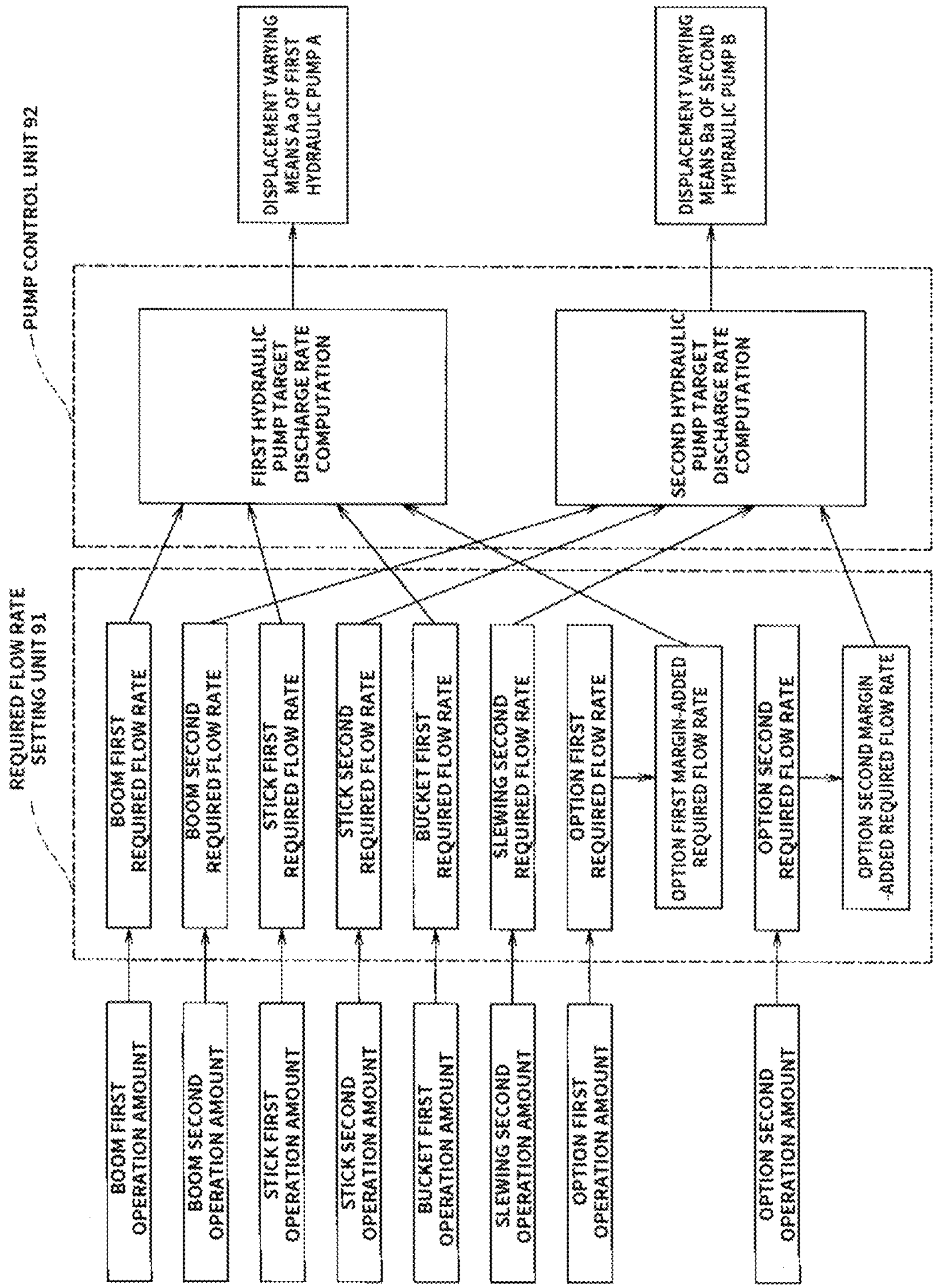
FIG. 8 is a control block diagram of required flow rate setting unit and a pump control unit.

Further, the required flow rate setting unit 91 determines required flow rates (a boom first required flow rate, a boom second required flow rate, a stick first required flow rate, a stick second required flow rate, a bucket first required flow rate, a slewing second required flow rate, an option first required flow rate, an option second required flow rate), which respective hydraulic actuators (the boom cylinder 8, the stick cylinder 9, the bucket cylinder 10, the slewing motor 11, the option hydraulic actuator 13) require from the first, second hydraulic pumps A, B, in accordance with the first, second operation amounts set by the first, second operation amounts setting unit 90. Furthermore, the required flow rate setting unit 91 sets option first, second margin-added required flow rates by adding a margin flow rate a to the option first, second required flow rates (refer to FIG. 8). The margin flow rate a, when pressurized oil is supplied to the option hydraulic actuator 13 from the first, second hydraulic pumps A, B, is a flow rate to be added to the option first, second required flow rates in order to avoid the shortage of pressurized oil to be supplied to the option hydraulic actuator 13 by the flow rate control performed by the above-described compensator valve 61 for the purpose of differential pressure adjustment. In case where the option first, second required flow rates are “zero”, the option first, second margin-added required flow rates become also “zero”.

Figures 7A, 7B, 7C:
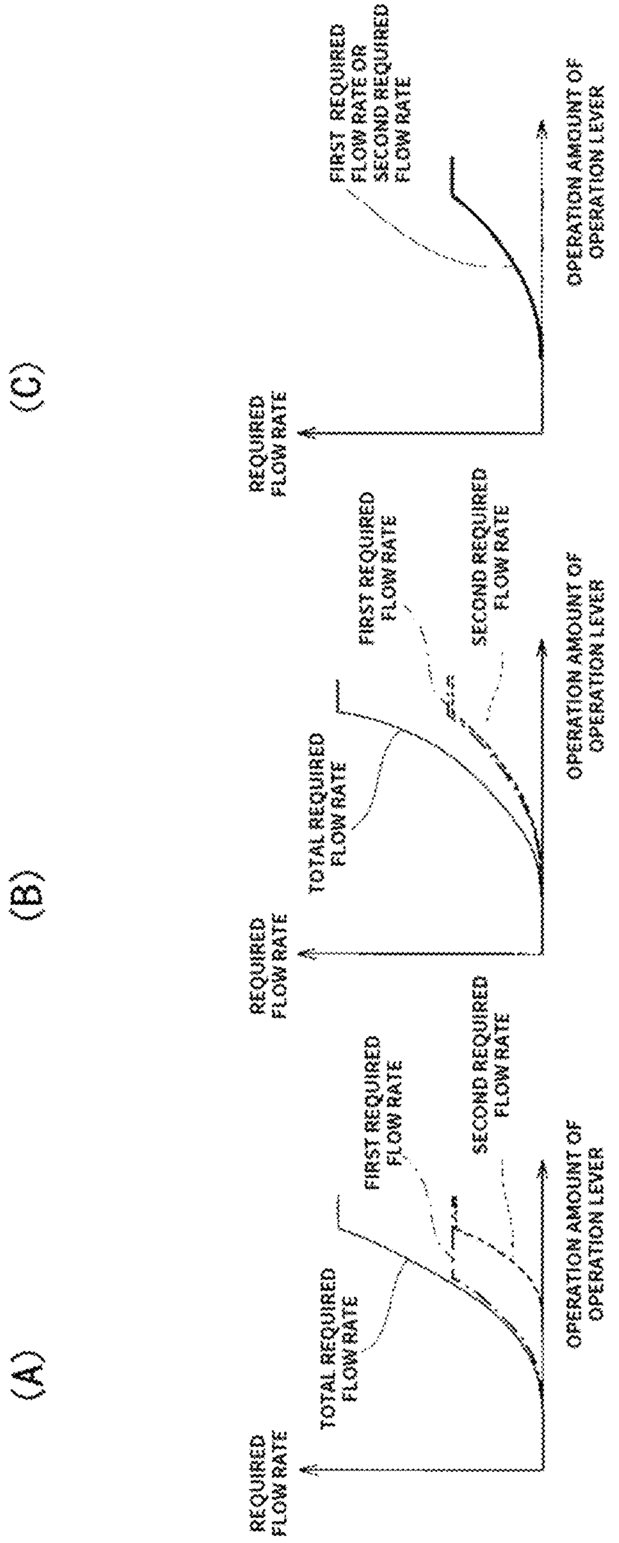
FIGS. 7(A), 7(B), 7(C) are diagrams each illustrating the relationship between operation amount of operation lever and required flow rate.

Now, FIGS. 7(A), 7(B), 7(C) illustrate relationships among option first, second operation amounts of operation lever, option first, second required flow rates, and an option total required flow rate (a total of then option first required flow rate and the option second required flow rate). However, 7(A) illustrates a case where, in the first/second operation amount setting unit 90, when operation amount of operation lever is small, only operation first operation amount is set (pressurized oil is supplied only from the first hydraulic pump A), and when operation amount of operation lever is large, option first, second operation amounts are set (pressurized oil is supplied from both the first, second hydraulic pumps A, B); 7(B) illustrates a case where option first, second operation amounts are set to the same values (the same amounts of pressurized oil are supplied from the first, second hydraulic pumps A, B); and 7(C) illustrates a case where only either one of the first, second operation amounts is set (pressurized oil is supplied only from either one of the first hydraulic pump A or the second hydraulic pump B).

The required flow rate setting unit 91 is provided with data such as a map, for example, illustrating a relationship between the first, second operation amounts and the required flow rates for each hydraulic actuator, and determines a required flow rate corresponding to an operation amount of operation lever using the data. Such data is adapted to be incorporated into the required flow rate setting unit 91 as control parameters; for example, according to work contents that the hydraulic shovel 1 performs and the type and the specification of the option hydraulic actuator 13, values of the required flow rates corresponding to the first, second operation amounts can be changed using the monitor device or the like.

Moreover, the pump control unit 92 computes a target discharge flow rate of the first, second hydraulic pumps A, B in accordance with required flow rates set by the required flow rate setting unit 91. In this case, regarding the required flow rates of the boom cylinder 8, the stick cylinder 9, the bucket cylinder 10, and the slewing motor 11, there are used the boom first, second required flow rates, the stick first, second required flow rates, the bucket first required flow rate, the slewing second required flow rate which have been set by the required flow rate setting unit 91; and regarding the required flow rate of the option hydraulic actuator 13, there is used the option first, second margin-added required flow rates obtained by adding the margin flow rate a. Then, the target discharge flow rate of the first hydraulic pump A is obtained by taking the total of the first required flow rates which respective hydraulic actuators operated requires from the first hydraulic pump A and the first margin-added required flow rate (the boom first required flow rate+the stick first required flow rate+the bucket first required flow rate+the option first margin-added required flow rate) as the target discharge flow rate. If a total flow rate exceeds a maximum discharge flow rate of the first hydraulic pump A, the maximum discharge flow rate is taken as the target discharge rate. Further, similarly, the target discharge flow rate of the second hydraulic pump B is obtained by taking the total of the second required flow rate which respective hydraulic actuators operated requires from the second hydraulic pump A and the second margin-added required flow rate (the boom second required flow rate+the stick second required flow rate+the slewing second required flow rate+the option second margin-added required flow rate) as the target discharge flow rate. If the total flow rate exceeds the maximum discharge flow rate of the second hydraulic pump B, the maximum discharge flow rate is taken as the target discharge flow rate. Then, the pump control unit 92 outputs control signals to the displacement varying means Aa, Ba of the first, second hydraulic pumps A, B so that the target discharge flow rate can be obtained (refer to FIG. 8). In case where the first operation amounts of respective hydraulic actuators are all “zero”, in case where the second operation amounts are all “zero”, the first, second hydraulic pumps A, B are controlled so that each has a minimum flow rate.

In addition, the valve opening area control unit 93 determines opening areas of the supply valve passages 23*c* to 26*c* of the boom, the stick, the bucket, the slewing control valves 23 to 26, the boom flow rate control valve 31, the first, second stick flow rate control valves 32, 33, and the supply valve passage 60*f* of the option control valve 60, in accordance with the required flow rates, which respective hydraulic actuators require the first, second hydraulic pumps A, B, determined by the required flow rate setting unit 91.

In this case, since a control process for determining opening areas of the control valves (the boom, the stick, the bucket, the slewing control valves) 23 to 26 for permanently mounted hydraulic actuators (the boom cylinder 8, the stick cylinder 9, the bucket cylinder 10, the slewing motor 11) and the flow rate control valves (the boom, the first, the second stick flow rate control valves) 31 to 33 is different from a control process for determining an opening area of the option control valve 60; first, the control of the opening areas of the control valves 23 to 26 of the permanently mounted hydraulic actuators and the flow rate control valves 31 to 33 will be discussed.

Upon determination of the opening areas of the control valves 23 to 26 and the flow rate control valves 31 to 33 for the permanent mounted hydraulic actuators, the valve opening area control unit 93, first, determines a distributed flow rate of each permanent hydraulic actuator. The computation of the distributed flow rate is performed separately by the first hydraulic pump A and the second hydraulic pump B. In other words, as for the distributed flow rate of the permanently mounted hydraulic actuator supplied with pressurized oil from the first hydraulic pump A, the target discharge flow rate of the first hydraulic pump A is distributed at a ratio between an option first margin-added required flow rate, a boom first required flow rate, a stick first required flow rate, a bucket first required flow rate, to determine a boom first distributed flow rate, a stick first distributed flow rate, a bucket first distributed flow rate. Also, as for the distributed flow rate of the permanently mounted hydraulic actuator supplied with pressurized oil from the second hydraulic pump B, the target discharge flow rate of the second hydraulic pump B is distributed at a ratio between the option second margin-added required flow rate, the boom second required flow rate, the stick second required flow rate, the slewing second required flow rate, to determine a boom second distributed flow rate, a stick second distributed flow rate, and a slewing second distributed flow rate. In case where the option first, second margin-added required flow rates are "zero", there is performed a distributed flow rate computation for distributing the entire rate of the target discharge flow rate to the permanently hydraulic actuators. Then, the valve opening area control unit 93 computes opening areas of the supply valve passages 23*c* to 26*c* of the boom, the stick, the bucket, the slewing control valves 23 to 26 for supplying these boom first, second distributed flow rates, the stick first, second distributed flow rates, the bucket first distributed flow rate, the slewing second distributed flow rate, respectively from the first, second hydraulic pumps A, B to the boom cylinder 8, the stick cylinder 9, the bucket cylinder 10, the slewing motor 11 and opening areas of the boom, the first, second stick flow rate control valves 31 to 33. Then, the valve opening area control unit 93 switches respective control valves 23 to 26 to the actuation position X or Y in correspondence with operation directions of respective operation levers for the boom, the stick, the bucket, the slewing motor, as well as outputs control signals to the boom, the stick, the bucket, the slewing solenoid proportional valves 44*a*, 44*b* to 47*a*, 47*b*, the boom flow rate control solenoid proportional valve 41, the first, second stick flow rate control solenoid proportional valves 42, 43 so as to attain the computed opening areas (refer to FIG. 9).

Upon controlling the opening areas of the control valves 23 to 26 and the flow rate control valves 31 to 33 for the permanently mounted hydraulic actuators, by adopting such a constitution of distributing the discharge flow rates of the first, second hydraulic pumps A, B at a ratio between the option first, second margin-added required flow rates and the required flow rate of the permanently mounted hydraulic actuator, even in case where the option hydraulic actuator 13 is combinedly operated with the other hydraulic actuators (the permanently mounted hydraulic actuators) that share the hydraulic pump A or/and B, it is configured such that the option first, second margin-added required flow rates are adapted to be supplied to the option merging oil passage 22, and thereby enabling to ensure reliably the supply flow rate to the option hydraulic actuator 13. In addition, as an example of control, it is also possible to adjust the option first, second margin-added required flow rates by multiplying the option first, second margin-added required flow rates with a flow rate limiting coefficient dedicated to combined operation, and to control so as to maintain the supply flow rate to the option hydraulic actuator 13 at a constant level.

On the other hand, the valve opening area control unit 93, in case of determining an opening area of the option control valve 60, computes an opening area of the supply valve passage 60*f* of the option control valve 60 for supplying a total flow rate of the option first, second required flow rates which is set by the required flow rate setting unit 91 to the option hydraulic actuator 13. Then, the valve opening area control unit 93 switches the option control valve 60 to the first actuation position X or the second actuation position Y, in correspondence with information of the option hydraulic actuator 13 input from the option hydraulic actuator notifying means 85 and the operation direction of the option operation lever; as well as to output control signals to the first, second option solenoid proportional valves 48*a*, 48*b* so as to attain the above computed opening areas (refer to FIG. 9). In this case, the differential pressure between front and behind of the supply valve passage 60*f* of the option control valve 60 is maintained at a constant level (the predetermined pressure K) by the compensator valve 61 described above. The supply flow rate from the option control valve 60 to the option hydraulic actuator 13 is controlled with a high precision so as to become a total flow rate of the option first, second required flow rates.

Further, the bleed control unit 94 performs control of the bleed flow rate which flows from the first, second hydraulic pumps A, B to the oil tank 12, in accordance with the first, second operation amounts determined by the first/second operation amount setting unit 90; and controls the discharge pressures of the first, second hydraulic pumps A, B, by the control of the bleed flow rate.

In this case, the bleed control unit 94, firstly determines first, second required pressures (boom first required pressure, boom second required pressure, stick first required pressure, stick second required pressure, bucket first required pressure, slewing second required pressure, option first required pressure, option second required pressure) which corresponding respective hydraulic actuators require the first, second hydraulic pumps A, B, in accordance with the boom first, second operation amounts, the stick first, second operation amounts, the bucket first operation amount, the slewing second operation amount, the option first operation amount. The bleed control unit 94 is provided with, for example, data such as a map illustrating a relationship between the first, second operation amounts and the required pressures for respective hydraulic actuators; and determines the required pressures corresponding to the operation amounts of the operation levers using the data, but such data is adapted to be incorporated in the bleed control unit 94 as control parameters. The values of the required pressures corresponding to the operation amounts can be changed, according to the work contents performed by the hydraulic shovel 1 and the type and the specification of the option hydraulic actuator 13.

Subsequently, the bleed control unit 94 determines first, second pump required pressures, in accordance with the first, second required pressures. In this case, a maximum value of the required pressures (the boom first required pressure, the stick first required pressure, the bucket first required pressure, the option first required pressure) which the respective hydraulic actuators require from the first hydraulic pump A is taken as a first pump required pressure PR1; a maximum value of the required pressures (the boom second required pressure, the stick second required pressure, the slewing second required pressure, the option second required pressure) which the respective hydraulic actuators require from the second hydraulic pump B is taken as a second pump required pressure PR2. In accordance with these first, second pump required pressures PR1, PR2, target pressures (first, second pump target pressures) PT1 and PT2 of the first, second hydraulic pumps A, B are set (refer to FIG. 10).

Upon setting the first, second pump target pressures PT1, PT2, the bleed control unit 94, firstly determines whether or not an option operation lever is being operated; if the option operation lever is not being operated (when both the option first, second operation amounts are "zero"), the first, second pump required pressures PR1, PR2 are set as the target pressures PT1, PT2 of the first, second hydraulic pumps A, B. On the other hand, if the option operation lever is being operated (when at least one of the option first, second operation amounts is not "zero"), the bleed control unit 94 performs an option priority control described below.

In case where the bleed control unit 94 performs the option priority control, the bleed control unit 94, firstly determines whether a hydraulic pump that supplies pressurized oil to the option hydraulic actuator 13 is only the first hydraulic pump A (only the option first operation amount is set) or only the second hydraulic pump B (only the option second operation amount is set) or both the first, second hydraulic pumps A, B (the option first, second operation amounts are set). Then, the first pump required pressure PR1 and the second pump required pressure PR2 are compared, in respective cases: a case where the determination result is only the first hydraulic pump A (hereinafter referred to as a determination result (A)); a case where only the second hydraulic pump B is determined (hereinafter referred to as a determination result (B)); a case where both the first, second hydraulic pumps A, B are determined (hereinafter referred to as a determination result (A+B)).

Then, if the first pump required pressure PR1 is higher than the second pump required pressure PR2 (PR1>PR2) in the determination result (A), then these first, second pump required pressures PR1, PR2 are set as the target pressures PT1, PT2 of the second hydraulic pumps A, B, respectively. On the other hand, if the first pump required pressure PR1 is equal to or lower than the second pump required pressure PR2 (PR1≤PR2) in the determination result (A), a pressure (PR2+β) obtained by adding the margin pressure R to the second pump required pressure PR2 is taken as the first pump target pressure PT1, and the second pump required pressure PR2 is set as the second pump target pressure PT2. As a result, in the case of the determination result (A), that is, if a hydraulic pump which supplies pressurized oil to the option hydraulic actuator 13 is only the first hydraulic pump A, then the target pressure PT1 of the first hydraulic pump A is the second hydraulic pump is set to a higher pressure than the target pressure PT2 of the second hydraulic pump B. The margin pressure R is a pressure to be added in order to ensure that the discharge pressure of the hydraulic pump that supplies pressurized oil to the option hydraulic actuator 13 is always higher than the discharge pressure of the hydraulic pump that does not supply pressurized oil to the option hydraulic actuator 13.

Further, if the first pump required pressure PR1 is higher than or equal to the second pump required pressure PR2 (PR1>PR2) in the determination result (B), then the first pump required pressure PR1 is taken as the first pump target pressure PT1, and a pressure (PR1+P) obtained by adding the margin pressure R to the first pump required pressure PR1 is set as the second pump target pressure PT2. On the other hand, if the first pump required pressure PR1 is smaller than the second pump required pressure PR2 (PR1<PR2), in the determination result (B), then these first, second pump required pressures PR1, PR2 are set as the target pressures PT1, PT2 of the first, second pumps. As a result, in the case of the determination result (B), that is, in case where a hydraulic pump that supplies pressurized oil to the option hydraulic actuator 13 is only the second hydraulic pump B, then the target pressure PT2 of the second hydraulic pump B is set so as to be higher than the target pressure PT1 of the first hydraulic pump A.

Figure 11:
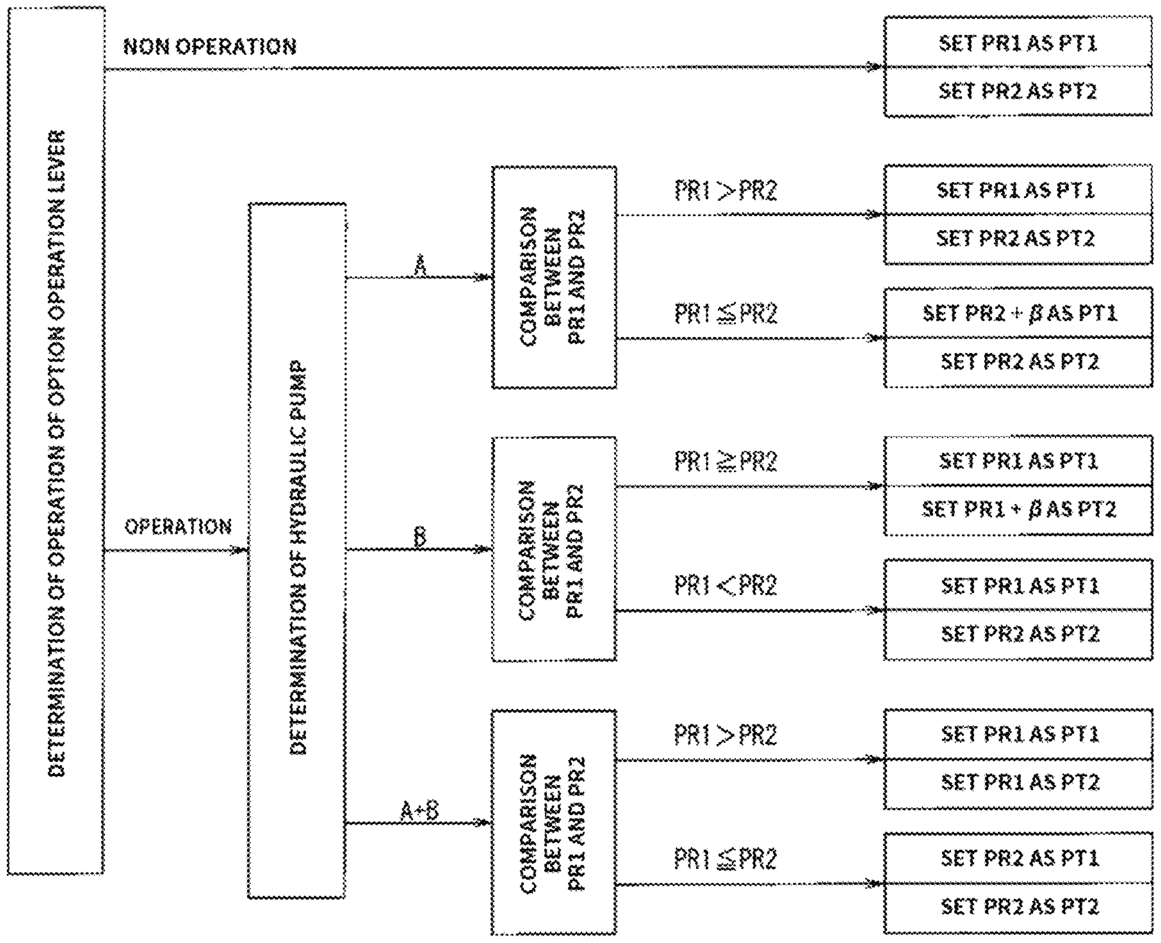
FIG. 11 is a control block diagram of first, second pump target pressure setting in the bleed control unit.

Further, if the first pump required pressure PR1 is larger than the second pump required pressure PR2 (PR1>PR2) in the determination result (A+B), then the first pump required pressure PR1 is set as the first, second pump target pressures PT1, PT2. On the other hand, if the first pump required pressure PR1 is less than or equal to the second pump required pressure PR2 (PR1<PR2) in the determination result (A+B), then the second pump required pressure PR2 is set as the first, second pump target pressures PT1, PT2. As a result, in the case of the determination result (A+B), that is, if hydraulic pumps that supply pressurized oil to the option hydraulic actuator 13 are both the first, second hydraulic pumps A, B, then these target pressures PT1, PT2 of the first, second hydraulic pumps A, B are set so as to be the same pressures by matching them with the higher pressure in the first, second pump required pressures PR1, PR2 (see FIG. 11).

In this way, if a hydraulic pump that supplies pressurized oil to the option hydraulic actuator 13 is either one of the first or second hydraulic pump A, B (in the case of the determination result (A) or (B)), the discharge pressure of the one hydraulic pump that supplies the pressurized oil is controlled to be higher than the discharge pressure of the another hydraulic pump that does not supply the pressurized oil, so that the pressurized oil supplied from the one hydraulic pump preferentially is adapted to flow into the option merging oil passage 22, and the pressurized oil supplied from the another hydraulic pump not to flow into the option merging oil passage 22. On the other hand, if both the first, second hydraulic pumps A, B supply the pressurized oil to the option hydraulic actuator 13 (in the case of the determination result (A+B)), the discharge pressures of both the hydraulic pumps A, B are controlled to be the same pressures, so that the pressurized oil supplied from both the first, second hydraulic pumps A, B is adapted to be supplied and merged to the option merging oil passage 22.

Figure 10:
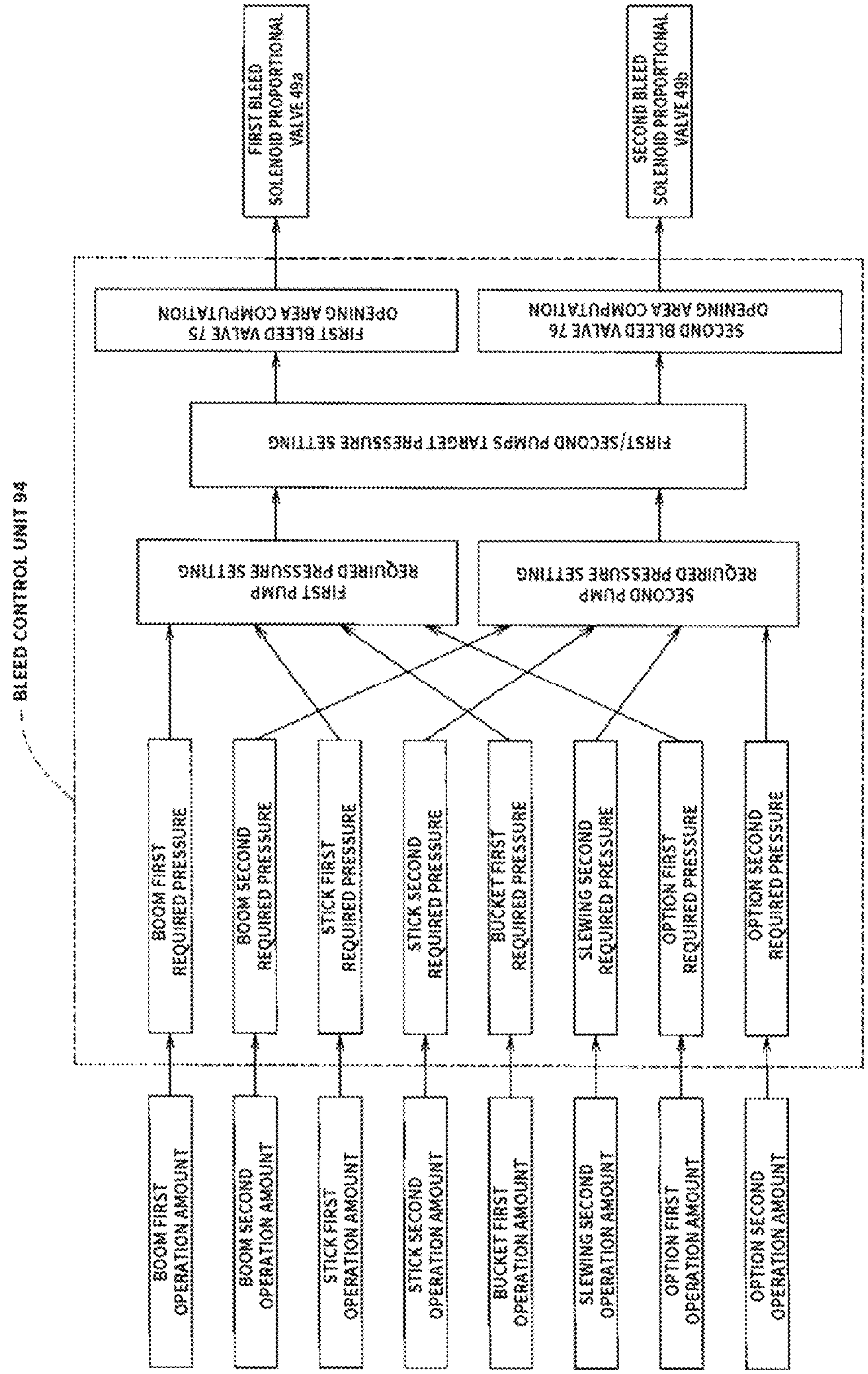
FIG. 10 is a control block diagram of a bleed control unit.

Then, the bleed control unit 94, after setting the target pressures PT1, PT2 of the first, second hydraulic pumps A, B is adapted to compute opening areas of the first, second bleed valves 75, 76 to reach the target pressures PT1, PT2; to output control signals to the first, second bleed solenoid proportional valves 49*a*, 49*b* to form opening areas; and to control the bleed flow rate flowing into the oil tank 12 from the first, second hydraulic pumps A, B (refer to FIG. 10). If all the first operation amounts of the respective hydraulic actuators are "zero", and if all the second operation amounts are "zero", then the bleed flow rate is controlled so that the discharge pressures of the first, second hydraulic pumps A, B become the preset lowest discharge pressure.

Also, the option control unit 95 performs option supply pressure control for setting a relief setting pressure LP of the variable relief valve 65 in order to perform supply pressure control to the option hydraulic actuator 13, in accordance with information input from the option hydraulic actuator notifying means 85 when an operation signal of the option operation lever is input from the option operation detecting means 84.

In this case, the option control unit 95 inputs from the option hydraulic actuator notifying means 85, values of the option upper limit pressure PU preset as the upper limit pressure of each option hydraulic actuator 13 depending on the type and specification of the option hydraulic actuator 13. Then, the option control unit 95 outputs control signals to the variable relief valve 65 in order to vary the relief setting pressure LP of the variable relief valve 65 to a pressure (LP=PU−K) obtained by subtracting the predetermined pressure (the pressure specified depending on a spring 61*c* of the compensator valve 61) K from the option upper limit pressure PU. As a result, an inlet-side pressure PO of the option control valve 60 is controlled to be less than or equal to PO≤(LP+K) a pressure, which is higher than the relief setting pressure LP of the variable relief valve 65 by the predetermined pressure K, (LP+K), that is, to be less than or equal to the option upper limit pressure PU (PO≤PU), by the action of the compensator valve 61 described above. Then, by controlling the inlet-side pressure of the option control valve 60 so as to be less than or equal to the option upper limit pressure PU, through the setting of the relief setting pressure LP of the variable relief valve 65 in this manner, the supply pressure to the option hydraulic actuator 13 can be less than the option upper limit pressure PU which is set depending on each option hydraulic actuator 13, even without providing variable relief valves respectively in the pair of first, second hydraulic actuator oil passages 67, 68 extending from the option control valve 60 to the option hydraulic actuator 13.

Moreover, the option control unit 95 performs load pressure relief control, when pressures of the first, second hydraulic actuator oil passages 67, 68 connected to the option hydraulic actuator 13 exceed the preset option upper limit pressure PU, for relieving the pressures, in accordance with information input from the option hydraulic actuator notifying means 85 and detection values of the first, second option pressure sensors 97, 98, when an operation signal for the option operation lever is not input from the option operation detecting means 84, that is, when the option operation lever is not operated.

Figure 12:
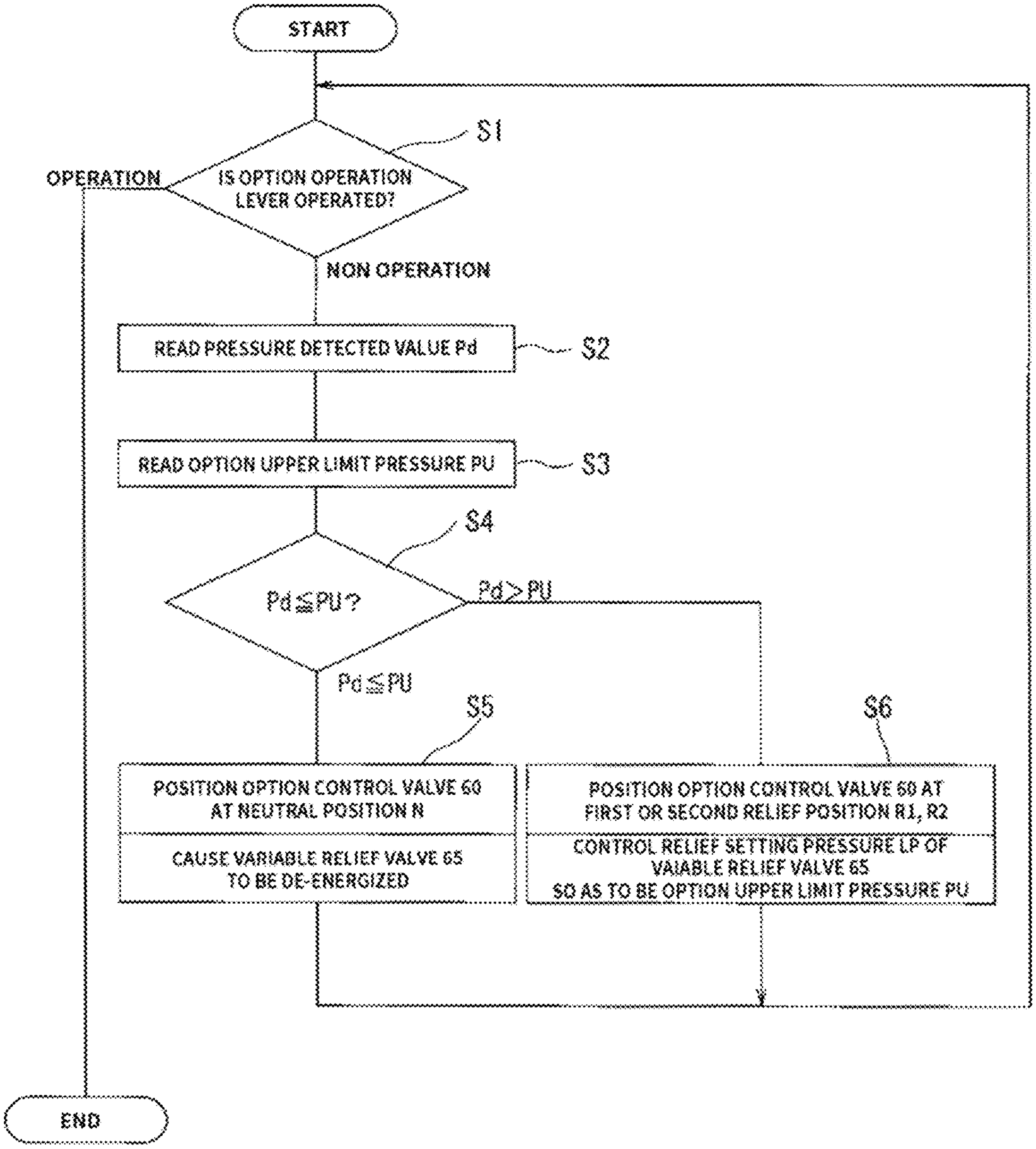
FIG. 12 is a flowchart illustrating a control procedure for load pressure relief control.

When the load pressure relief control is described with reference to the flowchart illustrated in FIG. 12, firstly the option control unit 95 determines whether or not an option operation lever is being operated (step S1).

If it is determined that the option operation lever is not operated (non-operation), the option control unit 95 recognize a high pressure holding side of the option hydraulic actuator 13 during non-operation of the option operation lever, in accordance with the information input from the option hydraulic actuator notifying means 85, and reads from the first or second option pressure sensors 97, 98, pressure detection values Pd of the first hydraulic actuator oil passage 67 or the second hydraulic actuator oil passage 68 connected to the high pressure holding side (step S2).

Further, the option control unit 95 reads from the option hydraulic actuator notifying means 85, the value of the option upper limit pressure PU, which is preset as the upper limit pressure of each option hydraulic actuator 13 depending on the type and specification of the option hydraulic actuator 13 (step S3).

Subsequently, the option control unit 95 compares (determination of Pd≤PU) the pressure detection values Pd of the first hydraulic actuator oil passage 67 or the second hydraulic actuator oil passage 68 on the high pressure holding-side on the high pressure holding side with the option upper limit pressure PU (step S4).

If the pressure detection value Pd is lower than or equal to the option upper limit pressure PU (Pd≤PU), by determination in step S4, the option control unit 95 controls the option control valve 60 so as to be positioned at the neutral position N, and causes the variable relief valve 65 to be de-energized (step S5). Consequently, the first, second hydraulic actuator oil passages 67, 68 are allowed to enter a state in which oil inflow and outflow is blocked by the option control valve 60 in the neutral position N. Then, after the processing of step S5, the process returns to the determination of step S1. The non-excited variable relief valve 65 has the maximum relief setting pressure LP.

On the other hand, if the pressure detection value Pd is greater than the option upper limit pressure PU (Pd>PU), by the determination in step S4, outputs a control command so as to be switched to the first or second load pressure relief positions R1, R2 (to the first load pressure relief position R1 when the first actuator oil passage 67 is on the high pressure holding-side; to the second load pressure relief position R2 when the second actuator oil passage 68 is on the high pressure holding-side) to the option control valve 60, in order to open the load pressure valve passage 60*h* extending from the first or second actuator port 60*c*, 60*d* connected to the first or second hydraulic actuator oil passages 67, 68 on the high pressure holding-side to the load pressure output port 60*e*. Moreover, the option control unit 95 outputs a control command to the variable relief valve 65 so that the relief setting pressure LP is equalized to the option upper limit pressure PU (or the relief setting pressure LP so as to be a value slightly lower than the option upper limit pressure PU) (Step S6). Consequently, the pressurized oil in the first or second hydraulic actuator oil passages 67, 68 on the high pressure holding-side is allowed to flow into the load pressure introducing oil passage 62 through the load pressure valve passage 60*h* of the option control valve 60, to flow into the oil tank 12 via the variable relief valve 65 connected to the load pressure introducing oil passage 62, thereby lowering the first or second hydraulic actuator oil passages 67, 68 on the high pressure holding-side. Then, after the processing of step S6, the process returns to the determination of step S1; but until it is determined that the option operation lever has been operated in the step S1, or the pressure detection value Pd is lower than or equal to the option upper limit pressure PU (Pd≤PU) in step S4, the control of step S6 is continued.

On the other hand, if it is determined in the step S1 that the option operation lever has been operated, then the above load pressure relief control ends. In other words, the load pressure relief control starts only when the option operation lever is not operated, and when the option operation lever is operated, the control ends even on the halfway of the load pressure relief control. Then, when the option operation lever is operated, the option control valve 60 is positioned at the first operating position X or the second operating position Y under the control of the valve opening area control unit 93 described above, and setting of the relief setting pressure LP is performed by the option supply pressure control performed by the option control unit 95, and the variable relief valve 65 is controlled so as to become the set relief setting pressure LP.

By the load pressure relief control being executed in this manner, in case where a pressure in the first or second hydraulic actuator oil passages 67, 68 on the high pressure holding-side in the non-operating state of the option operation lever exceeds the option upper limit pressure PU, the pressure will flow into the oil tank 12 via the option control valve 60 at the first or second load pressure relief positions R1, R2, the load pressure introducing oil passage 62, and the variable relief valve 65. Thus, even if the first, second hydraulic actuator oil passages 67, 68 are not provided with variable relief valves, the pressure in the first, second hydraulic actuator oil passages 67, 68 in the non-operating state of the option operation lever will be able to be controlled so as to become lower than or equal to the option upper limit pressure PU which is set in correspondence with individual option hydraulic actuator. Besides, since the load pressure relief control is a control performed utilizing the load pressure valve passage 60*h* formed in the option control valve 60 and the variable relief valve 65 used for option supply pressure control, it is possible to achieve common use of parts without separately requiring members dedicated to the load pressure relief control.

In this embodiment, the value of the option upper limit pressure used for the option supply pressure control and the value of the option upper limit pressure used for the load pressure relief control are set to the same values, but the option upper limit pressures with different values between the option supply pressure control and the load pressure relief control may be set.

Moreover, the option control unit 95 determines whether the option hydraulic actuator 13 is a hydraulic actuator of pressurized oil supply direction is one direction like a breaker, for example, and needs to reduce the back pressure, in accordance with the information input from the option hydraulic actuator notifying means 85, if an operation signal of the option operation lever is input the option operation detecting means 84. Then, if it is determined to be an applicable hydraulic actuator, then the option control unit 95 outputs a control signal to cause the switching valve 74 to be positioned at the open position X. As a result, a return oil from the option hydraulic actuator 13 to the oil tank 12 will flow directly to the oil tank 12 without passing through the option control valve 60, so that the back pressure can be reliably reduced.

Next, control performed when an option operation lever is operated, will be discussed, by illustrating Examples 1 to 4. In each Example, in case of a similar control to that in another Examples, the description will be brief or will be omitted.

Example 1

First, a case where the option operation lever is operated independently, and the option hydraulic actuator 13 is supplied with pressurized oil only from the first hydraulic pump A will be discussed as the Example 1.

In this case, the controller 30, when an operation signal is input from the option operation detecting means 84, firstly sets an option first operation amount, which is an operation amount for which the first hydraulic pump A serves. Moreover, depending on the option first operation amount, the option hydraulic actuator 13 determines an option first required flow rate which is required to the first hydraulic pump A, and an option first margin-added required flow rate obtained by adding a margin flow rate a to the option first required flow rate. Then, the discharge flow rate control of the first hydraulic pump A is performed by taking the option first margin-added required flow rate as the target discharge flow rate. Furthermore, the controller 30 sets an option first required pressure required by the option hydraulic actuator 13 of the first hydraulic pump A, depending on the option first operation amount; as well as the option first required pressure is set as a first pump required pressure PR1, moreover the first pump required pressure PR1 is set as a target pressure PT1 of the first hydraulic pump A, and an opening area of the first bleed valve 75 is controlled so as to reach the target pressure PT1. On the other hand, the discharge flow rate and discharge pressure of the second hydraulic pump B are controlled so as to be the lowest. Then, the pressurized oil supplied from the first hydraulic pump A flows into the option merging oil passage 22 via the first pump line C, the first option supply oil passage 17, and is supplied to the option hydraulic actuator 13 via the compensator valve 61 disposed in the option merging oil passage 22, the option control valve 60. Furthermore, the controller 30 controls the supply pressure to the option control valve 60 so as to be less than or equal to the option upper limit pressure PU, by setting the relief setting pressure LP of the variable relief valve 65 to a pressure (LP=PU−K) obtained by subtracting the predetermined pressure K from the option upper limit pressure PU that is set according to the type and specification of the option hydraulic actuator 13. In addition, the opening area of the supply valve passage 60*f* of the option control valve 60 is controlled so as to an opening area corresponding to the option first required flow rate; but in this case, since the differential pressure between front and behind of the option control valve 60 is held at the predetermined pressure K by the compensator valve 61, a highly accurate supply flow rate control can be performed; as well as the supply flow rate from the first hydraulic pump A is equivalent to the option first margin-added required flow rate obtained by adding the margin flow rate a to the option first required flow rate, even if the flow rate is controlled by the compensator valve 61 for purpose of differential pressure adjustment, the supply flow rate to the option control valve 60 will not come short. Moreover, in case where the option hydraulic actuator 13 is a hydraulic actuator that requires reduction in back pressure, a control signal is output so that the switching valve 74 be switched to the open position X, thereby enabling to cause the return oil from the option hydraulic actuator 13 to flow into the oil tank 12 via the bypass oil passage 73 without passing through the option control valve 60.

In this manner, in the Example 1, pressurized oil is supplied to the option hydraulic actuator 13 only from the first hydraulic pump A, but in this case, the supply pressure to the option control valve 60 is controlled to be less than or equal to the option upper limit pressure PU that is set depending on individual option hydraulic actuator 13, as well as the supply flow rate to the option hydraulic actuator 13 can be controlled with a high accuracy.

Example 2

Next, a case where an option operation lever is operated independently and pressurized oil is supplied to the option hydraulic actuator 13 from both the first, second hydraulic pumps A, B will be discussed as the Example 2.

In this case, the controller 30, when an operation signal is input from the option operation detecting means 84, firstly sets option first, second operation amounts. Furthermore, the controller 30 determines option first, second required flow rates, and option first, second margin-added required flow rates, depending on the option first, second operation amounts. Then, the discharge flow rates of the first, second hydraulic pumps A, B are controlled taking the option first, second margin-added required flow rates as the target discharge flow rates. Furthermore, the controller 30 sets option first, second required pressures depending on the option first, second operation amounts; as well as the option first, second required pressures are taken as the first, second pump required pressures PR1, PR2, respectively, moreover, higher pressures of these first, second pump required pressures PR1, PR2 are set as the target pressures PT1, PT2 (PT1=PT2) of both the first, second hydraulic pumps A, B, and opening areas of the first, second bleed valves 75, 76 are controlled so as to reach the target pressures PT1, PT2. As a result, the discharge pressures of the first, second hydraulic pumps A, B are controlled so as to be equalized. Then, the supply pressurized oil from the first, second hydraulic pumps A, B merges at the option merging oil passage 22 via the first, second pump lines C, D, the first, second option supply oil passages 17, 21, respectively; but in this case, since the discharge pressures of the first, second hydraulic pumps A, B are equalized, the supply oil from both the hydraulic pumps A, B flows into the option merging oil passage 22 without the supply of pressurized oil from either one of the hydraulic pumps A, B being prioritized at the time of merging, and is supplied to the option hydraulic actuator 13 via the compensator valve 61 disposed in the option merging oil passage 22, the option control valve 60. Then, the opening area of the supply valve passage 60*f* of the option control valve 60 is controlled so as to become an opening area corresponding to a total flow rate of the option first, second required flow rates; but in this case, similarly to the above-described Example 1, highly accurate supply flow rate control can be performed. Furthermore, the controller 30 sets the relief setting pressure LP of the variable relief valve 65 and performs switching control of the switching valve 74 depending on necessity, but these are similar to the Example 1 and therefore description will be omitted.

Thus, in the Example 2, the option hydraulic actuator 13 is supplied with pressurized oil from both the first, second hydraulic pumps A, B. Even in this case, similarly to the Example 1, the supply pressure to the option control valve 60 is controlled so as to be less than or equal to the option upper limit pressure PU that is set depending on individual option hydraulic actuator 13; as well as the supply flow rate to the option hydraulic actuator 13 can be controlled with a high accuracy. Besides, in this case, since the discharge pressures of the first, second hydraulic pumps A, B are controlled to be equalized, and the supply oil from both the hydraulic pumps A, B can be merged into the option merging oil passage 22, without the pressurized oil supply from either one of the hydraulic pumps A, B being prioritized.

Example 3

Next, a case where the option operation lever is being combinedly operated with the stick operation lever and the slewing operation lever, and the option hydraulic actuator 13 is supplied with pressurized oil from the first hydraulic pump A, and the stick cylinder 9 and the slewing motor 11 are supplied with pressurized oil from the second hydraulic pump B will be discussed as the Example 3.

In this case, the controller 30, when operation signals are input from the option, the stick, the slewing operation detecting means 84, 81, 83, firstly sets option first, stick second, slewing second operation amounts. Furthermore, the controller 30 determines option first, stick second, slewing second required flow rates, and option first margin-added required flow rate, corresponding to the option first, stick second, slewing second operation amounts. Then, the discharge flow rate of the first hydraulic pump A is controlled taking the option first margin-added required flow rate as the target discharge flow rate, and the discharge flow rate of the second hydraulic pump B is controlled, taking a total of the stick second required flow rate and the slewing second required flow rate as the target discharge flow rate (if a total flow rate exceeds the maximum discharge flow rate of the second hydraulic pump B, then the maximum discharge flow rate is taken as the target discharge flow rate). Furthermore, the controller 30 sets option first required pressure, stick second required pressure, slewing second required pressure corresponding to the option first, stick second, slewing second operation amounts. Then, the controller 30 uses the option first required pressure as the first pump required pressure PR1 and uses a higher pressure of the stick second and slewing second required pressures as the second pump required pressure PR2. Furthermore, the first pump required pressure PR1 and the second pump required pressure PR2 are compared, and the target pressures PT1, PT2 of the first, second hydraulic pumps A, B are set in accordance with the comparison result; but in this case, the target pressure PT1 of the first hydraulic pump A that supplies pressurized oil to the option hydraulic actuator 13 is set at a higher pressure than the target pressure PT2 of the second hydraulic pump B that does not supply pressurized oil to the option hydraulic actuator 13, and the opening areas of the first, second bleed valves 75, 76 are controlled so that the target pressures PT1, PT2 be reached, by the control of the bleed control unit 94 described above. Then, the supply pressurized oil from the first hydraulic pump A flows into the option merging oil passage 22 via the first pump line C, the first option supply oil passage 17; but in this case, since the discharge pressure of the first hydraulic pump A is higher than the discharge pressure of the second hydraulic pump B, the supply pressurized oil from the first hydraulic pump A preferentially flows into the option merging oil passage 22, and the supply pressurized oil from the second hydraulic pump B is adapted not to flow into the option merging oil passage 22. Then, the supply pressurized oil from the first hydraulic pump A that has flowed into the option merging oil passage 22 is supplied to the option hydraulic actuator 13 via the compensator valve 61 disposed in the option merging oil passage 22, the option control valve 60. The control of the opening area of the supply valve passage 60*f* of the option control valve 60 in this case, the setting of the relief setting pressure LP of the variable relief valve 65, and the switching control of the switching valve 74 performed depending on necessity are similar to the Example 1, and therefore the description will be omitted. On the other hand, the supply pressurized oil from the second hydraulic pump B flows into the second stick supply oil passage 19 from the second pump line D, and is supplied to the stick cylinder 9 via the second stick flow rate control valve 33, the stick control valve 24; as well as flows into the second slewing supply oil passage 20 from the second pump line D, and is supplied to the slewing motor 11 via the slewing control valve 26. In this case, the control of opening areas of the second stick flow rate control valve 33, the supply valve passages 24*c*, 26*c* of the stick, the slewing control valves 24, 26 is performed, discharge flow rate of the second hydraulic pump B are controlled so as to have the opening areas corresponding to the stick second distributed flow rate, the slewing second distributed flow rate, which is obtained by distributing the stick second required flow rate, the slewing second required flow rate, by the control of the valve opening area control unit 93 described above. In the Example 3, since it is configured such that the stick cylinder 9 is supplied with pressurized oil only from the second hydraulic pump B, the first stick flow rate control valve 32 disposed in the first stick supply oil passage 16 is controlled to be closed.

Thus, in the Example 3, the option operation lever is being combinedly operated with the operation levers for the other hydraulic actuators (the stick cylinder 9, the slewing motor 11), and the option hydraulic actuator 13 is supplied with pressurized oil from the first hydraulic pump A, and the other hydraulic actuators are supplied with pressurized oil from the second hydraulic pump B. In this case as well, similarly to the Examples 1, 2, the supply pressure to the option control valve 60 is controlled so as to be less than or equal to the option upper limit pressure PU that is set depending on individual option hydraulic actuator 13; as well as the supply flow rate to the option hydraulic actuator 13 can be controlled with a high accuracy. Besides in this case, since the discharge pressure of the first hydraulic pump A that supplies pressurized oil to the option hydraulic actuator 13 is controlled to become a higher than the discharge pressure of the second hydraulic pump B, only the supply pressurized oil from the first hydraulic pump A can be reliably caused to flow into the option merging oil passage 22. On the other hand, the discharge flow rate of the second hydraulic pump B is distributed to the other hydraulic actuators, thereby enabling to ensure good, combined operability between the option hydraulic actuator 13 and the other hydraulic actuators (the stick cylinder 9 the slewing motor 11).

Example 4

Next, a case in which the option operation lever is combinedly operated with the boom operation lever, the slewing operation lever, and the option hydraulic actuator 13 and the boom cylinder 8 are supplied with pressurized oil from the first hydraulic pump A, and the slewing motor 11 is supplied with pressurized oil from the second hydraulic pump B will be discussed as Example 4.

In this case, the controller 30, when operation signals are input from the option, the boom, the slewing operation detecting means 84, 80, 83, firstly sets an option first, boom first, slewing second operation amounts. Furthermore, the controller 30 determines an option first, boom first, slewing second required flow rate, and an option first margin-added required flow rate, depending on the option first, the boom first, the slewing second operation amounts. Then, the discharge flow rate control of the first hydraulic pump A is performed taking a total of the option first margin-added required flow rate and the boom first required flow rate as a target discharge flow rate (if the total flow rate exceeds the maximum discharge flow rate of the first hydraulic pump A, taking the maximum discharge flow rate as the target discharge flow rate), and the discharge flow rate control of the second hydraulic pump B is performed taking the slewing second required flow rate as a target discharge flow rate. Furthermore, the controller 30 sets option first, boom first, slewing second required pressures, depending on the option first, the boom first, the slewing second operation amounts. Then, a higher pressure of the option first, the boom first required pressures is taken as a first pump required pressure PR1, and the slewing second required pressure is taken as a second pump required pressure PR2. Furthermore, the first pump required pressure PR1 and the second pump required pressure PR2 are compared, and the target pressures PT1, PT2 of the first, second hydraulic pumps A, B are set in accordance with the comparison result; but in this case, the target pressure PT1 of the first hydraulic pump A that supplies pressurized oil to the option hydraulic actuator 13 is set at a higher pressure than the target pressure PT2 of the second hydraulic pump B that does not supply pressurized oil to the option hydraulic actuator 13, and the opening areas of the first, second bleed valves 75, 76 are controlled so that the target pressures PT1, PT2 be reached, by the control of the bleed control unit 94 described above. Then, the supply pressurized oil from the first hydraulic pump A flows into the first boom supply oil passage 14 from the first pump line C, and is supplied to the boom cylinder 8 via the boom control valve 23; as well as flows into the option merging oil passage 22 via the first option supply oil passage 17 from the first pump line C; but in this case, since the discharge pressure of the first hydraulic pump A is a higher pressure than the discharge pressure of the second hydraulic pump B, the supply pressurized oil from the first hydraulic pump A preferentially flows into the option merging oil passage 22, and the supply pressurized oil from the second hydraulic pump B is adapted not to flow into the option merging oil passage 22. The pressurized oil from the first hydraulic pump A which has been supplied from the first boom supply oil passage 14 to the boom control valve 23 is controlled such that the supply flow rate of the boom cylinder 8 is controlled in accordance with an opening area of the supply valve passage 23*c* of the boom control valve 23; but in this case, by the control of the valve opening area control unit 93 described above, an opening area of the supply valve passage 23*c* of the boom control valve 23 is controlled so as to attain an opening area corresponding to the boom first distributed flow rate obtained by distributing the discharge flow rate of the first hydraulic pump A at a ratio of the option first margin-added required flow rate, the boom first required flow rate. Consequently, the option first margin-added required flow rate obtained by adding the margin flow rate a to the option first required flow is allowed to flow into the option merging oil passage 22 from the first hydraulic pump A. Then, the supply pressurized oil from the first hydraulic pump A that has flowed into the option merging oil passage 22 is supplied to the option hydraulic actuator 13 via the compensator valve 61, the option control valve 60 disposed in the option merging oil passage 22. In this case, an opening area of the supply valve passage 60*f* of the option control valve 60 is controlled so as to become an opening area correspond to the option first required flow rate; but the control of the opening area, the setting of the relief setting pressure LP of the variable relief valve 65, the action of the compensator valve 61, the switching control of the switching valve 74 performed depending on necessity are similar to those in the Example 1, and thus the description thereof will be omitted. On the other hand, the supply pressurized oil from the second hydraulic pump B flows into the second slewing supply oil passage 20 from the second pump line D and is supplied to the slewing motor 11 via the slewing control valve 26. The control of an opening area of the supply valve passage 26*c* of the slewing control valve 26 of this case is performed so as to become an opening area corresponding to the slewing second required flow rate, because a hydraulic actuator supplied with pressurized oil from the second hydraulic pump B is only the slewing motor 11. In the Example 4, due to a configuration in which the boom cylinder 8 is supplied with pressurized oil only from the first hydraulic pump A, the boom flow rate control valve 31 disposed in the second boom supply oil passage 18 is controlled to close.

In this manner, in the Example 4, the option operation lever is combinedly operated with the operation levers for two other hydraulic actuators (the boom cylinder 8, the slewing motor 11), and the option hydraulic actuator 13 and the one of the other hydraulic actuators are supplied with pressurized oil from the first hydraulic pump A, and the another of the other hydraulic actuators is supplied with pressurized oil from the second hydraulic pump B; but even if the option hydraulic actuator 13 shares the other hydraulic actuators and the first hydraulic pump A in this manner, since the option first margin-added required flow rate obtained by adding the margin flow rate a to the option first required flow rate is supplied to the option merging oil passage 22. Consequently, even when the flow rate is controlled for purpose of differential pressure adjustment by the compensator valve 61, the supply flow rate to the option control valve 60 will never come short; then in this case also, similarly to the Examples 1 to 3, the supply pressure to the option control valve 60 is controlled so as to be less than or equal to the option upper limit pressure PU that is set depending on an individual option hydraulic actuator 13; as well as the supply flow rate to the option hydraulic actuator 13 can be controlled with a high accuracy. Besides in this case, since the discharge pressure of the first hydraulic pump A that supplies pressurized oil to the option hydraulic actuator 13 is controlled to become a higher than the discharge pressure of the second hydraulic pump B, only the supply pressurized oil from the first hydraulic pump A can be reliably caused to flow into the option merging oil passage 22. On the other hand, the discharge flow rate of the second hydraulic pump B is supplied to the another of the other hydraulic actuators, thereby enabling to ensure good, combined operability between the option hydraulic actuator 13 and the other hydraulic actuators (the boom cylinder 8, the slewing motor 11).

In the present embodiment configured as described above, a hydraulic control system for a hydraulic shovel 1 is provided with an option control circuit that is shared for a plurality of option hydraulic actuators 13 selectively mounted thereon; but the option control circuit is provided with an option control valve 60 that performs oil supply and discharge control to and from the option hydraulic actuator 13 in accordance with an operation of the option operation lever; the first, second hydraulic actuator oil passages 67, 68 that connects the option control valve 60 and the option hydraulic actuator 13; the first, second option pressure sensors 97, 98 for detecting pressures of these first, second hydraulic actuator oil passages 67, 68, respectively; a compensator valve 61 disposed on upstream-side of the option control valve 60, introduces the inlet-side pressure and the outlet-side pressure of the option control valve 60, and operates in order to maintain a differential pressure between the introduced inlet-side pressure and the outlet-side pressure at a predetermined pressure K; and a controller 30 for controlling the operation of the option control valve 60. Furthermore, the variable relief valve 65 capable of varying the relief setting pressure LP in response to control signals from the controller 30 is connected to the load pressure introducing oil passage 62 for introducing the pressure on the outlet-side of the option control valve 60 to the compensator valve 61. By lowering the pressure of the load pressure introducing oil passage 62 down to the relief setting pressure LP by the variable relief valve 65 and introducing it to the compensator valve 61, the inlet-side pressure of the option control valve 60 can be variably controlled in accordance with the change in the relief setting pressure LP of the variable relief valve 65; but in the option control circuit, the switching positions of the option control valve 60 include the first, second load pressure relief positions R1, R2 that does not allow oil supply and discharge to be performed to and from the option hydraulic actuator 13, but allows the pressures of the first, second hydraulic actuator oil passages 67, 68 to flow into the load pressure introducing oil passage 62. In case where the pressure in the first or second hydraulic actuator oil passages 67, 68 exceeds the option upper limit pressure PU, which is preset depending on individual option hydraulic actuator 13, during non-operation of an option operation lever, by switching the option control valve 60 to the first or second load pressure relief position R1 or R2 and controlling the relief setting pressure LP of the variable relief valve 65 so as to become lower than or equal to the option upper limit pressure PU, the pressure in the first or second hydraulic actuator oil passages 67, 68 that has exceeded the option upper limit pressure PU can be released to the oil tank 12 via the option control valve 60, the load pressure introducing oil passage 62, the variable relief valve 65.

As a result, the upper limit pressure of pressurized oil, of which flow rate is controlled by the option control valve 60 and is supplied to the option hydraulic actuator 13, can be variably controlled so as to become a pressure corresponding to an individual option hydraulic actuator 13, by changing the relief setting pressure LP of the variable relief valve 65 connected to the load pressure introducing oil passage 62 in response to control signal from the controller 30; and therefore compared to the option control circuit that is configured to dispose variable relief valves respectively in a pair of the first, second hydraulic actuator oil passages 67, 68 extending from the option control valve 60 to the option hydraulic actuator 13, and to variably control the upper limit pressure of the supply pressurized oil to the option hydraulic actuator 13, thereby enabling reduction of the variable relief valves, and contribution to cost reduction. Besides, in this option control circuit, in case where a pressure in the first, second hydraulic actuator oil passages 67, 68 exceeds the option upper limit pressure PU during non-operation of the option operation lever, the pressure can be released to the oil tank 12 via the option control valve 60, the load pressure introducing oil passage 62, the variable relief valve 65. Accordingly, even when the variable relief valves are not provided in the first, second hydraulic actuator oil passages 67, 68, the pressure in the first, second hydraulic actuator oil passages 67, 68 in a non-operating state of the option operation lever will be able to be controlled so as to become less than or equal to the option upper limit pressure PU which is set corresponding to individual option hydraulic actuator. Besides, this control is a control performed utilizing the option control valve 60 for performing the oil supply and discharge control of the option hydraulic actuator 13 in accordance with the operation of the operation lever, and the variable relief valve 65 used for variable control of the supply pressure to the option hydraulic actuator 13, thereby enabling to achieve common use of parts without the need for separate dedicated members.

Moreover, the hydraulic control system includes other hydraulic actuators (the boom cylinder 8, the stick cylinder 9, the bucket cylinder 10, slewing motor 11) provided in the hydraulic shovel 1 other than the option hydraulic actuator 13, and the first, second hydraulic pumps A, B serving as hydraulic supply sources for these other hydraulic actuators; but the option hydraulic actuator 13 uses either one or both of the first, second hydraulic pumps A, B as hydraulic supply sources; as well as the option control circuit includes the first, second option supply oil passages 17, 21 connected to the first, second hydraulic pumps A, B, respectively, and the option merging oil passage 22 that allows these first, second option supply oil passages 17, 21 to be merged thereinto, and the compensator valve 61 and the option control valve 60 are disposed in the option merging oil passage 22. Consequently, even if the option hydraulic actuator 13 uses only the first hydraulic pump A, only the second hydraulic pump B, or both the hydraulic pumps A, B, whichever the case may be, as the hydraulic supply sources, one option control Oil supply and discharge control to and from the option hydraulic actuator 13 can be performed only by one option control valve 60, thereby enabling contribution to reduction in the number of parts.

Moreover, the hydraulic control system includes the first, second bleed valves 75, 76 for controlling bleed flow rate that flows into the oil tank 12 from the first, second hydraulic pumps A, B respectively in accordance with control signals output from the controller 30, and is configured such that the discharge pressure of the first, second hydraulic pumps A, B is controlled by the bleed flow rate control by the first, second bleed valves 75, 76; but in this case, the controller 30, when the option hydraulic actuator 13 uses only either one of the first, second hydraulic pumps A, B as the hydraulic supply source, causes the discharge pressure of the one hydraulic pumps acting as the hydraulic supply source to be higher than the discharge pressure of the another hydraulic pump not acting as the hydraulic supply source, and when the option hydraulic actuator 13 uses both the first, second hydraulic pumps A, B as the hydraulic supply sources, performs bleed flow rate control so that the discharge pressures of the second hydraulic pumps A, B will be equalized. As a result, when the option hydraulic actuator 13 uses only one of the first, second hydraulic pumps A, B as the hydraulic supply source, the supply pressurized oil from the one hydraulic pump acting as the hydraulic supply source can be caused preferentially to flow into the option merging oil passage 22, and the supply pressurized oil from the another hydraulic pump not acting as the hydraulic supply source will not flow into the option merging oil passage 22; and when the option hydraulic actuator 13 uses both of the hydraulic pumps A, B as the hydraulic supply source, the supply pressurized oil from both of the hydraulic pumps A, B is adapted to be merged into the option merging oil passage 22. Therefore, even if the first, second option supply oil passages 17, 21 are not provided with valves for opening and closing the oil passages 17, 21 respectively, in both cases where either one of the first, second hydraulic pumps A, B acts as the hydraulic supply source, and where both the first, second hydraulic pumps act as the hydraulic supply sources, only the supply pressurized oil from the hydraulic pump acting as the hydraulic supply source can be supplied to the option merging oil passage 22, thereby enabling reduction of the number of parts, and contribution to cost reduction. In addition, when the option hydraulic actuator 13 uses either one of the first, second hydraulic pumps A, B as the hydraulic supply source, and the other hydraulic actuators use the another hydraulic pump as the hydraulic supply sources, the supply pressurized oil from the one hydraulic pump flows into the option merging oil passage 22 and is used only for the option hydraulic actuator 13; on the other hand, the supply pressurized oil from the another hydraulic pump does not flow into the option merging oil passage 22, and the entire amount of the supply pressurized oil will be used only for the other hydraulic actuators, thereby enabling to ensure good, combined operability between the option hydraulic actuator 13 and the other hydraulic actuators.

INDUSTRIAL APPLICABILITY

The present invention, in a working machine such as a hydraulic shovel, can be utilized for a hydraulic control system when an option hydraulic actuator is mounted on the working machine.

The invention claimed is:

1. A hydraulic control system in a working machine equipped with an option control circuit that is shared for a plurality of option hydraulic actuators that is selectively mounted in the working machine, the option control circuit further comprising:

an option control valve for performing oil supply and discharge control to and from an option hydraulic actuator in accordance with an operation of an option operation lever;

a pair of actuator oil passages that connect the option control valve and the option hydraulic actuator;

a pressure sensor for detecting a pressure of the actuator oil passages;

a pressure compensating valve which is disposed on an upstream-side of the option control valve and is actuated in order to maintain a differential pressure, by an inlet-side pressure and an outlet-side pressure of the option control valve being introduced, between the introduced inlet-side pressure and outlet-side pressure at a predetermined pressure; and a control device for controlling an actuation of the option control valve;

wherein the option control circuit is configured such that, by connecting a variable relief valve capable of varying a relief setting pressure in response to control signals from the control device, to a load pressure introducing oil passage that introduces the outlet-side pressure of the option control valve to the pressure compensating valve, and lowering a pressure of the load pressure introducing oil passage down to the relief setting pressure by the variable relief valve and introducing the pressure of the load pressure introducing oil passage to the pressure compensating valve, a pressure of the inlet-side of the option control valve can be variably controlled in accordance with change of the relief setting pressure of the variable relief valve;

wherein the option control circuit is configured such that, by providing a load pressure relief position at which oil supply and discharge to and from the option hydraulic actuator is not performed, but the pressure of the actuator oil passages is allowed to flow into the load pressure introducing oil passage, in a switching position of the option control valve, and by switching the option control valve to the load pressure relief position, when the pressure in the actuator oil passages exceeds an upper limit pressure that is preset depending on individual optional hydraulic actuator during non-operation of the option operation lever; as well as by controlling the relief setting pressure of the variable relief valve so as to be less than or equal to the upper limit pressure, the pressure in the actuator oil passages exceeding the upper limit pressure is released to an oil tank via the option control valve, the load pressure introducing oil passage, and the variable relief valve.

2. The hydraulic control system in the working machine according to claim 1, wherein the hydraulic control system in the working machine comprises first, second hydraulic pumps serving as hydraulic supply sources for other hydraulic actuators to be provided in the working machine other than the option hydraulic actuator, wherein the option hydraulic actuator uses either one or both of these first, second hydraulic pumps as the hydraulic supply sources; as well as wherein the option control circuit comprises first, second option supply oil passages connected to the first, second hydraulic pumps respectively, and an option merging oil passage that allows these first, second option supply oil passages to be merged thereinto, wherein the pressure compensating valve and the option control valve are disposed in the option merging oil passage.

3. The hydraulic control system in the working machine according to claim 2, wherein the hydraulic control system in the working machine is configured to comprise first, second bleed valves for controlling a bleed flow rate that flows into an oil tank from the first, second hydraulic pumps in response to control signals output from the control device, and to control discharge pressures of the first, second hydraulic pumps in accordance with bleed flow rate control by the first, second bleed valves; as well as the control device performs bleed flow rate control so that, in case where the option hydraulic actuator uses either one of these first, second hydraulic pumps as the hydraulic supply sources, the discharge pressure of one hydraulic pump serving as the hydraulic supply source will be set higher than discharge pressure of the another hydraulic pump not serving as the hydraulic supply source; in case where the option hydraulic actuator uses both the first, second hydraulic pumps as the hydraulic supply sources, the discharge pressures of the first, second hydraulic pumps will be equalized.

* * * * *